United States Patent
Anigstein

(10) Patent No.: US 7,558,572 B2
(45) Date of Patent: Jul. 7, 2009

(54) METHODS AND APPARATUS FOR DETERMINING AND/OR COMMUNICATING PARAMETER SWITCHING POINT INFORMATION IN WIRELESS COMMUNICATIONS SYSTEMS INCLUDING WIRELESS TERMINALS SUPPORTING MULTIPLE WIRELESS CONNECTIONS

(75) Inventor: Pablo Anigstein, Springfield, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 11/314,721

(22) Filed: Dec. 21, 2005

(65) Prior Publication Data

US 2007/0142048 A1 Jun. 21, 2007

(51) Int. Cl.
*H04Q 7/20* (2006.01)

(52) U.S. Cl. .................. 455/435.2; 455/67.11; 455/436; 370/331

(58) Field of Classification Search .............. 455/435.2, 455/436–439, 67.11; 370/331, 332
See application file for complete search history.

(56) References Cited

U.S. PATENT DOCUMENTS

| | | | |
|---|---|---|---|
| H2106 H * | 7/2004 | Bilgic et al. | 370/281 |
| 6,816,483 B1 * | 11/2004 | Beckstrom et al. | 370/356 |
| 2005/0079823 A1 * | 4/2005 | Kurek et al. | 455/67.11 |
| 2005/0157876 A1 | 7/2005 | Jeong et al. | |
| 2007/0002889 A1 * | 1/2007 | Sekhar | 370/458 |

FOREIGN PATENT DOCUMENTS

WO WO 02/080454 10/2002

OTHER PUBLICATIONS

"Broadcast-Multicast Service Security Framework" 3rd Generation Partnership Project 2, vol. 3GPP2, No. S.R.0083-0, dated Oct. 16, 2003; p. 1-17.
International Search Report and Written Opinion of International Searching Authority from International Application No. PCT/US2006/048523. Dated Jul. 10, 2007; p. 1-10.
International Preliminary Report on Patentability—PCT/US06/048523, International Search Authority—European Patent Office, Jan. 10, 2008.

* cited by examiner

*Primary Examiner*—Cong Van Tran
(74) *Attorney, Agent, or Firm*—Michael P. Straub; James K. O'Hare

(57) ABSTRACT

Methods and apparatus for indicating parameter change points with respect to multiple connections (wireless links) by transmitting a single message, e.g., over one of the connections, is described. A base station corresponding to at least one connection, considers the approximate timing relationship between the connections, selects one of the connections, selects an intended parameter switching point for that connection, determines a symbol time offset from the selected switching point such that the other intended switching points of other wireless links can be unambiguously interpreted by the wireless terminal from information indicating the offset with respect to the selected link, and communicates information indicating the offset and the wireless link to which said offset applies. A wireless terminal receives the information, identifies a time referenced with respect the timing structure of the identified wireless link and then determines individual parameter switching points for the other wireless links.

52 Claims, 10 Drawing Sheets

METHODS AND APPARATUS FOR DETERMINING AND/OR COMMUNICATING PARAMETER SWITCHING POINT INFORMATION IN WIRELESS COMMUNICATIONS SYSTEMS INCLUDING WIRELESS TERMINALS SUPPORTING MULTIPLE WIRELESS CONNECTIONS

FIELD OF THE INVENTION

The present invention relates to communications systems and, more particularly, to methods and apparatus for determining and/or communicating parameter switching point information, e.g., in a wireless communications network including wireless terminals supporting multiple concurrent wireless links.

BACKGROUND

In wireless communications systems there are typically control parameters which need to be changed during operations. Some of these parameters are used in defining connections and logical link layer operations. One such type of parameter is a key, e.g. an encryption key. In wireless communications systems in which a wireless terminal supports only a single concurrent connection and parameter switching points are limited to predetermined points in a recurring timing structure, a parameter change message can be sent which unambiguously communicates when to perform the parameter switch, e.g., the messages identifies a superslot boundary in a repetitive timing structure being used by the base station attachment point.

If a system allows for a wireless terminal to maintain multiple wireless communications links at the same time, which may not be synchronized in time at the wireless terminal and/or basestation(s), signaling when a parameter is to be changed with individual ones of the wireless communications links is much more complicated than in the case of signaling with respect to a parameter change point which is to be implemented for a single wireless connection.

To facilitate the implementation of systems where a wireless terminal might support multiple wireless communications links at the same time, there is a need for new methods and apparatus which provide for signaling parameter switching points corresponding to multiple connections using the same parameter which needs to be switched. Methods and apparatus which facilitate more efficient signaling techniques conserving air link resources would be beneficial. Methods and apparatus which provide, for each of multiple connections, for an unambiguous understanding by the base station attachment point and the wireless terminal, as to a parameter switching point with respect to the repetitive timing structure implemented for that connection would be beneficial.

SUMMARY OF INVENTION

Figure 1:
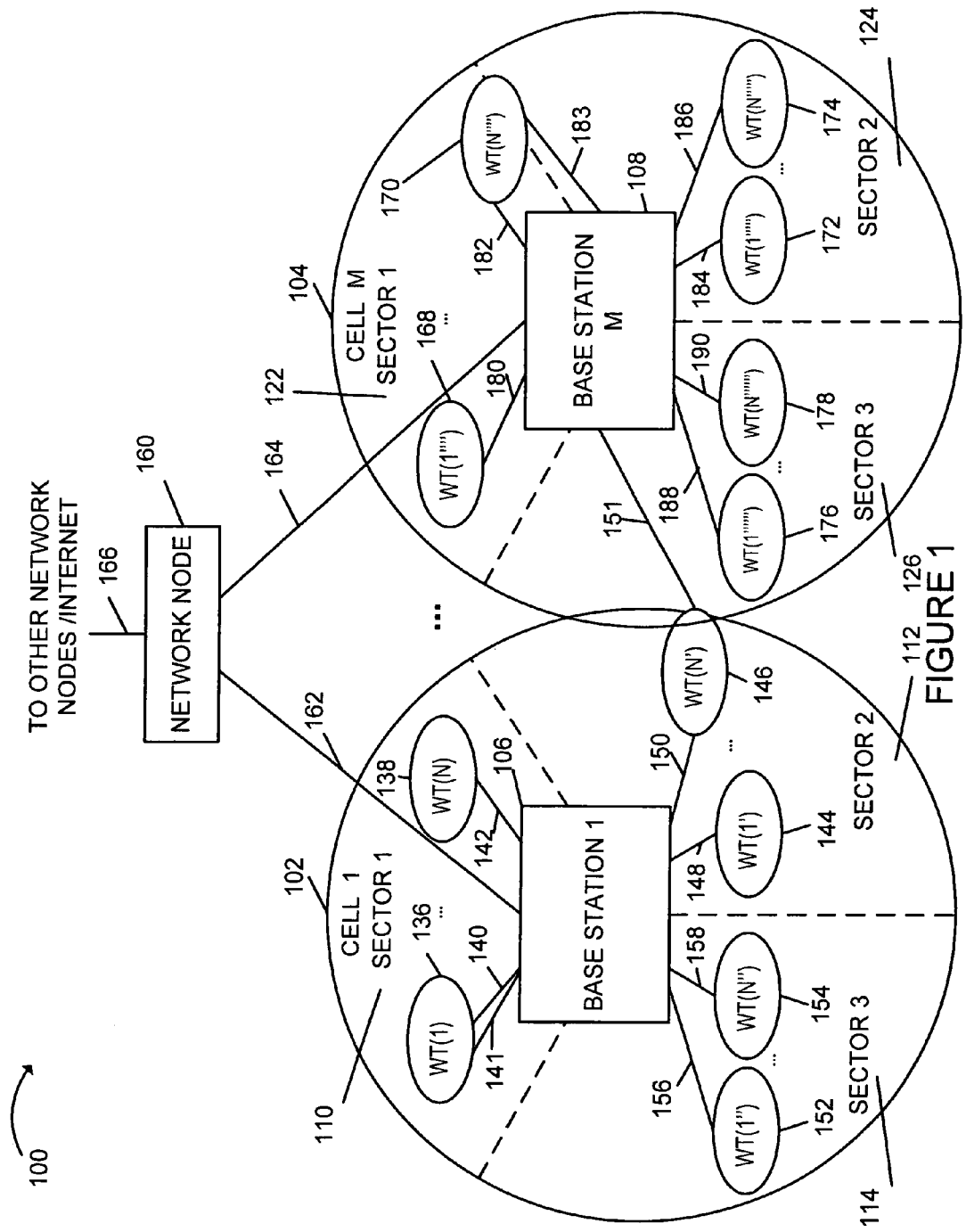
FIG. 1 is a drawing of an exemplary communications system implemented in accordance with the present invention.

The present invention is directed to methods and apparatus for determining parameter switching points and/or communicating parameter switching point information. The methods and apparatus of the invention are particular well suited for systems where wireless terminals can support multiple concurrent wireless communications links. The wireless communications links may or may not be timing synchronized. In fact, even if timing synchronization exists at s base station with respect to multiple communications links, timing synchronization may not exist at the wireless terminal for the communications links due to different transmission distances between the wireless terminal and the various different physical attachment points to which the communications links correspond.

A wireless communications link, also sometimes referred to a wireless link, refers to a connection. The connection may be between, for example, a wireless terminal and a base station physical attachment point. A wireless link is normally implemented as an air link connection. The base station physical attachment point to which a wireless link corresponds, may be identified, at least locally, by one or a combination of physical layer identifiers. Such physical layer identifiers may include, for example, a cell identifier, a sector or sector type identifier, and/or a carrier or tone block identifier. In some but not all embodiments, a combination of a cell identifier, sector type identifier and carrier or tone block identifier is used to identity a physical attachment point. The physical layer identifier or combination of physical layer identifiers which may be used in a system to identify a physical attachment point can vary depending on the system implementation, e.g., if multiple sectors and/or carriers per sector are supported.

It should be appreciated that multiple wireless links may correspond to the same link layer link. For example, different sectors of a base station implemented using a single link layer controller may have physical attachment points of different sectors corresponding to the same link layer link. Similarly, when a sector supports multiple carriers or tone blocks, each corresponding to a different physical attachment point from a physical layer perspective, the physical attachment points corresponding to different carriers or tone blocks may, but do not necessarily have to, operate under the same link layer controller. Thus multiple physical layer attachment points may correspond to the same link layer link. While multiple physical attachment points may correspond to a single link layer link, normally multiple link layer links used concurrently by the same wireless terminal do not correspond to the same physical attachment point.

The possibility that timing synchronization does not exist for multiple concurrent wireless links, even when they correspond to the same link layer link or base station, complicates the issue of communicating when a parameter used for processing information communicated over the current links should be changed with respect to individual wireless links in the plurality of concurrent links. The issue may be encountered, e.g., when an encryption parameter used for multiple wireless links (connections) corresponding to different physical attachment points but the same logical link, is to be changed. As noted above, the multiple different concurrent connections may, but often are not, fully synchronized with one another. When they are not fully synchronized, the implementation of the parameter change will often be different on the different links due to the lack of full timing synchronization.

In a wireless communications system, where a wireless terminal supports multiple simultaneous wireless communications connections with a plurality of different base station sector attachment points, unambiguously communicating parameter switching information such that both the base station(s) and the wireless terminal have the same understanding as to which parameter (old or new) to use at any given time with respect to the timing structure being used corresponding to each wireless link can be problematic. For example, consider that the same parameter may be used with respect to communications over multiple connections and may need to be switched. Consider that different base station sector attachment points may not be synchronized. In addition consider that different base stations may be timing independent of one another such that the timing structure with respect to one base station drifts with respect to the timing structure with respect to another base station. In addition a wireless terminal's location with respect to different base station sector attachment points influences synchronization with respect to each of the base station sector attachment points, e.g., due to the differences of signal path delay. Under such conditions, a wireless terminal's view of the timing offsets between different base station sector attachment points may be different than a base station's understanding.

In such a case, using a single parameter change message sent from a base station identifying a parameter switching point as a superslot boundary with respect to a first connection may be ambiguous with respect to the other connections. However, sending multiple parameter switching messages, e.g., one for each connection is inefficient in terms of the use of air link resources. In addition, if some of the multiple parameter switching messages are successfully received while other are not, this can create problems in the switching operation, e.g., especially if time sensitive user data is being partitioned among the plurality of connections.

Various embodiments of the present invention are directed to methods and apparatus for using a single message to communicate sufficient information to a wireless terminal so that a wireless terminal can determine the appropriate time to change a parameter being used with respect to a plurality of wireless links maintained by the wireless terminal at the same time. The single message may identify the parameter to be changed or the parameter to which the message applies may be known, e.g., from the time the message is transmitted or some other information.

Some embodiments of the invention are directed to operating a base station to indicate to a wireless terminal a plurality of parameter switching points, different ones of said parameter switching points corresponding to different wireless communications links. The wireless communications links in various embodiments have a repetitive timing structure, e.g., an uplink and/or downlink timing structure. The indicated switching points correspond to positions, e.g., superslot, within the repetitive timing structure of a corresponding one of the different communication links where parameter switching may be implemented.

In one particular exemplary embodiment, the method, from a base station perspective, includes selecting an offset point in time with respect to a first link in a plurality of concurrent communications links with a wireless terminal, the selected offset point in time being offset in time from the parameter switching point of the first link by a time offset. The base station then transmits information indicating the offset point in time to the wireless terminal for use by the wireless terminal in determining the parameter switching points corresponding said plurality of concurrent communications links. The switching point in time that is determined, e.g., on a per link basis, for different links, may be different due to differences in wireless link synchronization and/or the repetitive timing structure used on the different wireless links.

Various features of the present invention are directed to methods and apparatus for operating a wireless terminal to receive and process parameter switching point information and to determine from the information received in a message the appropriate time to change the parameter with respect to a plurality of different wireless links. The method of operating a wireless terminal in some embodiments includes receiving parameter switching point information over at least one of a plurality of wireless communications links corresponding to the wireless terminal where the received switching point information indicates a point offset from a parameter switching point to be used for a first one of the wireless links. The wireless terminal determines a reference point in time from the received parameter switching point information corresponding to the first wireless communications link, said first wireless communications link being one of said plurality of wireless communications links. In addition, from the received information, the wireless terminal proceeds to determine a plurality of individual parameter switching points, each determined individual parameter switching point corresponding to a different one of said plurality of wireless communications links. Information about timing synchronization differences between the different wireless links relative to the first link may be used in making the determination as to when the switching point of links other than the first link is to be implemented. Differences, if any, in terms of the repetitive timing structure and location of permissible switching points with respect to different links may also be taken into consideration and used by the wireless terminal in determining the parameter switching point to be used for the various individual wireless links.

An exemplary embodiment of the present invention shall now be described. Other embodiments are also possible. In the exemplary embodiment a wireless terminal has multiple concurrent connections with a plurality of base station attachment points, each base station attachment point corresponding to a base station cell, a sector and a downlink tone block. Each connection is associated with a timing structure including potential parameter switching points within the structure, e.g., superslot boundaries. From the wireless terminal's perspective the timing structures corresponding to the multiple concurrent connections are not necessarily synchronized, e.g., due to lack of synchronization with respect to the base station sector transmitters, due to receiver processing delay differences and/or due to path delay differences. A parameter, e.g., an encryption key, used for communications over a plurality of the concurrent wireless links is to be switched. For example, the encryption key, in some embodiments is used for multiple connections for the same wireless terminal corresponding to the same logical link. For example in some embodiments at some times, packets of user data to be communicated are partitioned and/or communicated with some degree of redundancy among a plurality of connections. A base station corresponding to one of the sector attachment points, considers the approximate timing relationship between the connections, selects one of the wireless links, selects an intended parameter switching point for that wireless link at a superslot boundary, determines a symbol time offset from the selected superslot boundary such that the other intended switching points of other wireless links should be unambiguously interpreted by the wireless terminal, and communicates parameter switching point information. In some embodiments, the parameter switching point information includes: a connection identifier, a superslot identifier, and a symbol time offset. In some embodiments, the connection identifier is not communicated with the wireless terminal recognizing that the wireless link over which the parameter switching point information was communicated is the connection to which the communicated timing information is being referenced. A wireless terminal receives the communicated switching point parameter information, which identifies a time referenced with respect to the timing structure of the identified connection. The wireless terminal identifies, for connections, e.g., each connection in the plurality of connections, a parameter switching point using a predetermined agreed upon relationship of the intended switching point to the time reference. A function, e.g., predetermined or preprogrammed function known to the wireless terminal and base station, may be used to implemented the predetermined agreed upon relationship. In some embodiments, the parameter switching point is the last preceding superslot boundary prior to the identified referenced time. For each connection, the wireless terminal implements the parameter switching using the determined parameter switching point time corresponding to the connection and parameter switching protocol rules.

While various embodiments have been discussed in the summary above, it should be appreciated that not necessarily all embodiments include the same features and some of the features described above are not necessary but can be desirable in some embodiments. Numerous additional features, embodiments and benefits of the present invention are discussed in the detailed description which follows.

DETAILED DESCRIPTION OF INVENTION

FIG. 1 shows an exemplary communication system 100 implemented in accordance with the present invention including multiple cells: cell 1 102, cell M 104. Exemplary system 100 is, e.g., an exemplary OFDM spread spectrum wireless communications system such as a multiple access OFDM system. Each cell (102, 104) of exemplary system 100 includes three sectors. Cells which have not been subdivided into multiple sectors (N=1), cells with two sectors (N=2) and cells with more than 3 sectors (N>3) are also possible in accordance with the invention. Each sector supports one or more carriers and/or downlink tones blocks. In some embodiments at least some of the sectors support three downlink tones blocks. In some embodiments, for each downlink tone block there is a corresponding uplink tone block. Cell 102 includes a first sector, sector 1 110, a second sector, sector 2 112, and a third sector, sector 3 114. Similarly, cell M 104 includes a first sector, sector 1 122, a second sector, sector 2 124, and a third sector, sector 3 126. Cell 1 102 includes a base station (BS), base station 1 106, and a plurality of wireless terminals (WTs) in each sector 110, 112, 114. Sector 1 110 includes WT(1) 136 and WT(N) 138 coupled to BS 106 via wireless links 140, 142, respectively; sector 2 112 includes WT(1') 144 and WT(N') 146 coupled to BS 106 via wireless links 148, 150, respectively; sector 3 114 includes WT(1") 152 and WT(N") 154 coupled to BS 106 via wireless links 156, 158, respectively. Similarly, cell M 104 includes base station M 108, and a plurality of wireless terminals (WTs) in each sector 122, 124, 126. Sector 1 122 includes WT(1''') 168 and WT(N''') 170 coupled to BS M 108 via wireless links 180, 182, respectively; sector 2 124 includes WT(1'''') 172 and WT(N'''') 174 coupled to BS M 108 via wireless links 184, 186, respectively; sector 3 126 includes WT(1''''') 176 and WT(N''''') 178 coupled to BS M 108 via wireless links 188, 190, respectively.

System 100 also includes a network node 160 which is coupled to BS1 106 and BS M 108 via network links 162, 164, respectively. Network node 160 is also coupled to other network nodes, e.g., other base stations, AAA server nodes, intermediate nodes, routers, etc. and the Internet via network link 166. Network links 162, 164, 166 may be, e.g., fiber optic cables. Each wireless terminal, e.g. WT 1 136, includes a transmitter as well as a receiver. At least some of the wireless terminals, e.g., WT(1) 136, are mobile nodes which may move through system 100 and may communicate via wireless links with the base station in the cell in which the WT is currently located, e.g., using a base station sector attachment point. The wireless terminals, (WTs), e.g. WT(1) 136, may communicate with peer nodes, e.g., other WTs in system 100 or outside system 100 via a base station, e.g. BS 106, and/or network node 160. WTs, e.g., WT(1) 136 may be mobile communications devices such as cell phones, personal data assistants with wireless modems, etc.

The wireless terminals (136, 138, 144, 146, 152, 154, 168, 170, 172, 174, 176, 178) support multiple simultaneous connections with different base station sector attachment points. Exemplary wireless terminal (N''') 170, situated in a cell M sector boundary area and has one wireless communications link 182 with a base station M sector 1 attachment point and another wireless communications link 183 with a base station M sector 2 attachment point. Exemplary WT (N') 146, situated in a cell boundary area between cell 1 102 and cell M 104 has one wireless communications link 150 with a base station 1 sector 2 attachment point and another wireless communications link 151 with a base station M sector 3 attachment point. Exemplary WT(1) 136, situated in cell 1 sector 1 has one wireless communications link 140 with a base station 1 sector 1 attachment point and another wireless communications link 141 with a different base station 1 sector 1 attachment point. Each base station sector attachment point corresponds to a base station cell, a sector, and a downlink tone block.

In some embodiments, synchronization exists with respect to some base station sector attachment points with respect to one another, while some base station sector attachment points are asynchronous with respect to one another. For example in some embodiments, with respect to two different downlink tone blocks corresponding to the same base station sector there is precise synchronization at the base station; with respect to different adjacent sectors of the same base station there is a high level of synchronization, e.g. to within a symbol transmission time period. In some such embodiments, two sector base station transmitters of the same base station are synchronized to within a micro-second. Continuing with the example, base station sector transmitters of different base stations are asynchronous.

In some embodiments, the base station sector transmitters of the same cell are asynchronous. In some embodiments, the downlink timing structure corresponding to different base station sector attachments points of the same sector of the same cell, but using different downlink tone blocks are synchronous at the base station. In some embodiments, the downlink timing structure corresponding to different base station sector attachments points of the same sector of the same cell, but using different downlink tone blocks are asynchronous at the base station.

In accordance with the present invention, a base station (106, 108) determines parameter switching points for one or more wireless communications links, e.g., pertaining to switching a parameter such as an encryption key, corresponding to a wireless terminal, e.g., WT 170 or WT 151, or WT 136, and communicates switching point information to the wireless terminal, the switching point information including an offset including a symbol time index referenced with respect to one of the wireless communications links. The wireless terminal receives and processes the switching point information, and determines switching points corresponding to each of one or more wireless communications links, each wireless communications link representing a connection between a base station sector attachment point and the wireless terminal. In some embodiments, the parameter being switched corresponds to a parameter used for multiple physical connections corresponding to the same logical link.

In some embodiments, a wireless terminal has a plurality of concurrent wireless connections including a first subset of connections corresponding to a first logical link and a second subset of connections corresponding to a second logical link, said first subset and said second subset being non-overlapping and said first and second logical links being different. In such an embodiment, a parameter to be switched may be a parameter that corresponds to the first logical link and the first subset of connections, but not to the second logical link and second subset of connections. In some such embodiments, the parameter switching methods in accordance with the present invention performed by the base station and wireless terminal, under such conditions, consider timing related to the timing structures of the first subset of connections, but not to the second subset of connections.

Figure 2:
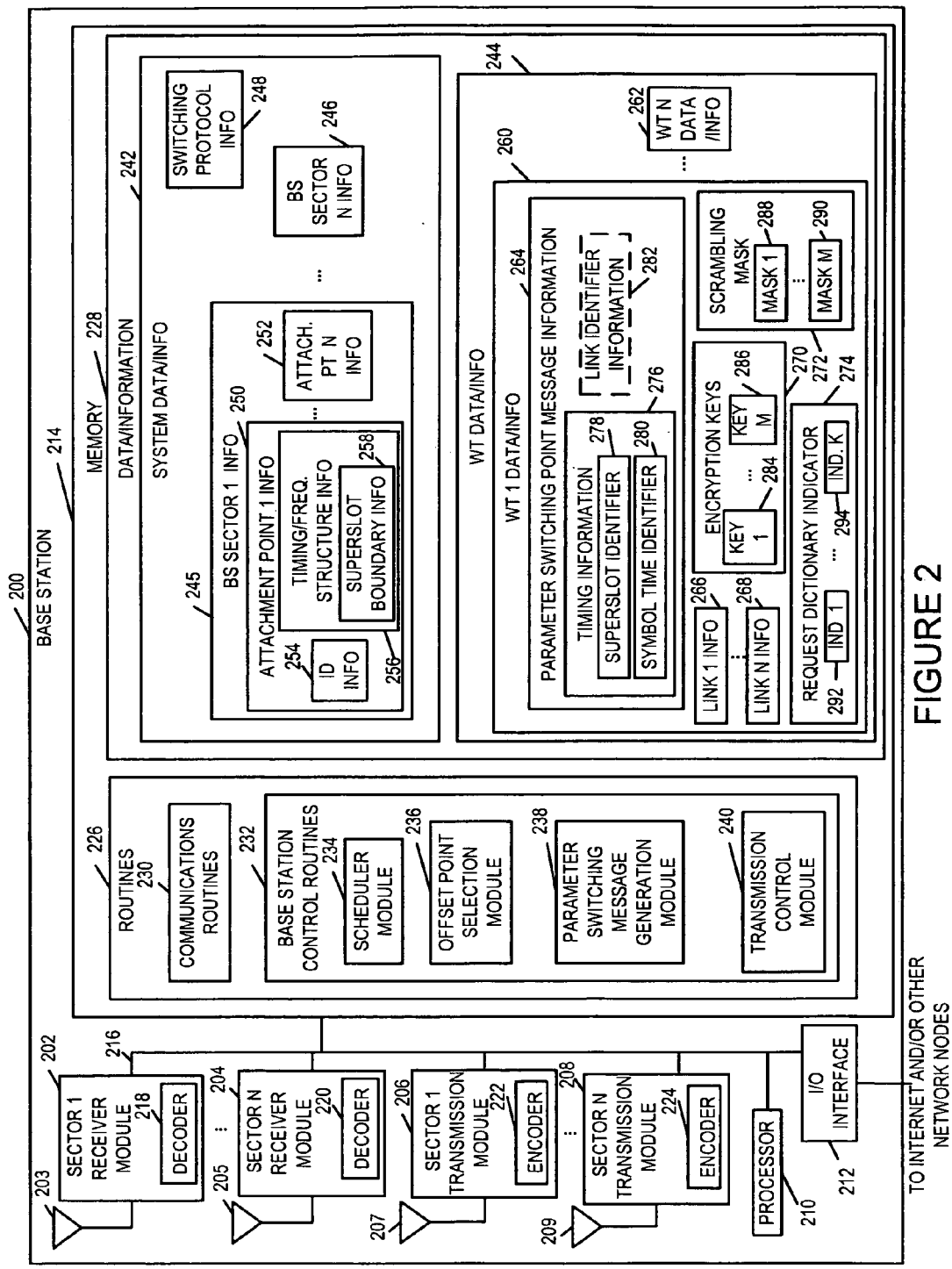
FIG. 2 is a drawing of an exemplary base station implemented in accordance with the present invention and using methods of the present invention.

FIG. 2 is a drawing of an exemplary base station 200 implemented in accordance with the present invention and using methods of the present invention. Exemplary base station 200 may be any of the exemplary base stations (106, 108) of FIG. 1, 402 of FIG. 4, or (702, 724) of FIG. 7. Exemplary base station 200 includes one or more sector receiver modules (sector 1 receiver module 202, . . . , sector N receiver module 204), one or more sector transmission modules (sector 1 transmission module 206, . . . , sector N transmission module 208), a processor 210, I/O interface 212 and memory 214 coupled together via bus 216 over which the various elements interchange data and information.

Sector 1 receiver module 202, e.g., an OFDM sector receiver, is coupled to sector 1 receive antenna 203 via which the base station receives uplink signals from wireless terminals directed to a sector 1 attachment point of the base station. Sector 1 receiver module 202 includes a decoder 218 used for decoding at least some of the received uplink signals. Sector N receiver module 204, e.g., an OFDM sector receiver, is coupled to sector N receive antenna 205 via which the base station receives uplink signals from wireless terminals directed to a sector N attachment point of the base station. Sector N receiver module 204 includes a decoder 220 used for decoding at least some of the received uplink signals.

Sector 1 transmission module 206, e.g., an OFDM sector transmitter, is coupled to a sector 1 transmit antenna 207 via which the transmission module transmits downlink signals to wireless terminals. Sector 1 transmission module 206 includes an encoder 222 which is used to encode at least some downlink data/information prior to transmission. Sector N transmission module 208, e.g., an OFDM sector transmitter, is coupled to a sector N transmit antenna 209 via which the transmission module transmits downlink signals to wireless terminals. Sector N transmission module 208 includes an encoder 224 which is used to encode at least some downlink data/information prior to transmission. The transmission modules (206, 208) are used for transmitting information indicating an offset point in time to a wireless terminal, e.g., as part of a parameter switching message, to indicate to the wireless terminal a plurality of parameter switching points, different ones of the parameter switching points corresponding to different wireless communications links, e.g., different simultaneous wireless communications links between the wireless terminal and base station attachment points.

I/O interface 212 couples base station 200 to the Internet and/or other network nodes, e.g., other base stations, routers, AAA nodes, home agent nodes, etc. I/O interface 212 provides an interface to a backhaul network, thus allowing a wireless terminal using a base station 200 attachment point to participate in a communications session with another wireless terminal using a different base station as its point of network attachment. Timing information, e.g., coarse timing information, pertaining to other base stations, e.g., adjacent base stations is, in some embodiments, communicated via I/O interface 212. In this way, base station 200 is able to use this timing information, when making a decision regarding parameter switching offset timing in a case where a wireless terminal is connected to both base station 200 and an adjacent base station, and the parameter to be switched is to be switched with respect to wireless connections corresponding to both BS 200 and the adjacent base station.

Memory 200 includes routines 226 and data/information 228. The processor 210, e.g., a CPU, executes the routines 226 and uses the data/information 228 in memory 214 to control the operation of the base station 200 and implement the methods of the present invention.

Routines 226 include a communications routine 230 and base station control routines 232. The communications routine 230 implements the communications protocols used by the base station 200. Base station control routines 232 include a scheduler module 234, an offset point selection module 236, a parameter switching message generation module 238, and a transmission control module 240.

Scheduler module 234, e.g., a scheduler, schedules a plurality of wireless terminal users. The scheduler module assigns uplink and downlink segments to the wireless terminals. For example, for each attachment point of the base station corresponding to a sector and tone block, the base station scheduler partitions the available air link resources between a plurality of wireless terminals currently using that attachment point.

Offset point selection module 236 selects an offset point in time with respect to a first link in a plurality of wireless communications links which is offset in time from a parameter switching point corresponding to the first link by a time offset, the time offset being selected for use in indicating a plurality of switching points, each switching point corresponding to a position within the repetitive timing structure of a corresponding one of the different communications links.

Selection module 236 selects an offset point in time with respect to a first link by selecting a time which occurs in the timing structure of the first link which is offset from the parameter switching point corresponding to the first link by at least one symbol time period. In addition, selection module 236 perform its selection such that the switching point in time for each of the additional wireless links in the plurality of wireless links corresponding to the wireless terminal are also offset in time by at least one symbol time period.

Parameter switching point message generation module 238 generates a parameter switching message including a timing offset with respect to a first link which is at least one symbol time period from a switching boundary. For example, in one exemplary embodiment, the generated parameter switching message includes a superslot identifier, a symbol time identifier and a link identifier. In some embodiments, the link identifier is a connection identifier including a cell identifier, a sector type identifier, and a tone block identifier. In some such embodiments, the connection identifier is unique locally in the system such that a wireless terminal having multiple simultaneous connections will have unique connection identifiers corresponding to each connection. In some embodiments, the generated parameter switching message includes a superslot identifier and a symbol time identifier, but does not include a link identifier. In some embodiments, the parameter switching message is a portion of a larger message.

Transmission control module 240 controls the operation of sector transmitter modules (206, 208). The transmission control module 240, in some embodiments, controls a sector transmission module (206, 208) to transmit to the wireless terminal information indicating which one of said communications links said offset point in time corresponds to, e.g., a parameter switching message including a time offset and link identification information, e.g., a connection identifier. In some embodiments, the transmission control module 240 controls the base station to use the sector transmitter module corresponding to the first link to which the offset point in time is being specified to be the link which communicates the parameter switching information to the wireless terminal. In this way, the base station is able to communicate the identity of the first link among a plurality of links without transmitting express information identifying which one of a plurality of links the offset point in time corresponds to.

In some embodiments, a transmission module, e.g., sector 1 transmission module 206, transmits information indicating the selected offset point in time at a point in time prior to the selected offset point in time, which precedes the switching point corresponding to the first link, by at least 5 times the period between potential switching points in the repetitive timing structure being used for the first link. For example, in some embodiments, potential switching points correspond to superslot boundaries, and the information is transmitted initially at a point in time at least 5 superslots prior to the indicated switching point. This intentional early initial transmission allows for the possibility of retransmission in the event that the message is not successfully recovered by the wireless terminal. In some such embodiments, a transmission module, e.g., sector 1 transmission module 206, transmits information indicating the selected offset point in time at a point in time prior to the selected offset point in time which precedes each switching point corresponding to different ones of a plurality of wireless links being maintained with the wireless terminal by at least 5 times the period between potential switching points. In some embodiments, different wireless communications links use different timing structure and/or different periods between potential switching points, and for a given wireless link, the communicated switching point information is transmitted at a point in time prior to the switching point by at least five times the period between potential switching points.

In some embodiments, a transmission module, e.g., sector 1 transmission module 206, transmits information indicating the selected offset point in time at a point in time prior to the selected offset point in time, which precedes the switching point corresponding to the first link, by at least 40 times the period between potential switching points in the repetitive timing structure being used for the first link, e.g., 40 superslots. In some embodiments, the transmitted information indicates a selected switching point for the first link at least 40 superslots into the future and at most 143 superslots into the future.

Data/information 228 includes system data/information 242 and wireless terminal data/information 244. System data/information 242 includes one or more base station sector sets of information corresponding to the sectors of the base station (base station sector 1 information 245, . . . base station sector N information 246) and switching protocol information 248. Base station sector 1 information 245 includes one or more of sets of attachment point information (attachment point 1 information 250, . . . , attachment point N information), each set of attachment point information corresponding to a different downlink tone block used by the base station sector. In some embodiments, each downlink tone block has a corresponding uplink tone block. Attachment point 1 information includes identification information 254 and timing/frequency structure information 256. Identification information 254 includes base station cell, sector, tone block and/or carrier identification information. In some embodiments at least some of the base station identification information is communicated via downlink broadcast signals such as beacon and/or pilot signals. Timing/frequency structure information 256 includes downlink and uplink timing and frequency structure information. In some embodiments, for a given attachment point, there is a downlink tone block, a downlink channel structure, downlink tone hopping sequencing, and a downlink timing structure following a repetitive pattern; in addition there is an uplink tone block, an uplink channel structure, uplink tone hopping sequencing, and an uplink timing structure following a repetitive pattern. In some such embodiments, for a given attachment point the uplink and downlink timing structures are coupled together, e.g., via a fixed timing offset at the base station. Timing frequency structure information 256 includes superslot boundary information 258. In various embodiments, potential parameter switching points for a communications link are limited to occur at pre-selected timing boundaries being used by a communications link. In some embodiments, the pre-selected timing boundaries occur at fixed time spacing. In some embodiments the pre-selected timing boundaries are superslot boundaries which are spaced apart by at least 101 OFDM symbol transmission time periods, e.g., 114 OFDM symbol transmission time periods.

The downlink timing structure for a given attachment point, e.g., corresponding to a base station sector and tone block may be the same or different with respect to another base station sector and tone block. In some embodiments, at some times the superslot boundaries of different links corresponding to connections with the same wireless terminal are offset from one another. For example each sector at the base station may use the same basic downlink timing structure, but there may be an offset from one base station sector with respect to an adjacent base station sector, such that the superslot boundaries for the two links are offset with respect to one another.

Switching protocol information 248 includes information used to implement the parameter switching rules regarding the change of a parameter, e.g., an encryption key, a scrambling mask identifier, a request dictionary indicator. For example, a parameter switching message indicates times for switching a parameter such as an encryption key with respect to different links, each parameter switching point being identified as a superslot boundary in the timing structure of that link. However, some traffic channel segments assigned to the wireless terminal may straddle the identified superslot boundary. Exemplary switching protocol information controls whether the particular segment is to be encoded using the old key or the new key. In some embodiments, different rules apply for uplink and downlink traffic channel segments.

Wireless terminal data/information 244 includes a plurality of sets of wireless terminal data/information (wireless terminal 1 data/information 260, . . . , wireless terminal N data/information 262), each set of information corresponding to a wireless terminal using base station 200 as a point of attachment. WT 1 data/information 260 includes parameter switching point message information 264, one or more sets of link information (link 1 information 266, . . . , link N information 268), encryption keys (key 1 info 284, . . . , key M info 286), scrambling masks 272 (scrambling mask 1 288, . . . , scrambling mask M 290), and request dictionary indicators 274 (indicator 1 information 292, indicator K information 294). Parameter switching point message information 264 includes timing information 276 and, in some embodiments, link identifier information 282. Timing information 276, which defines a point in a timing structure includes a superslot identifier 278 and a symbol time identifier 280. In some embodiments, within each ultraslot in a recurring timing structure there are 144 indexed superslots, and within each superslot there are 114 indexed OFDM symbol transmission time periods. Link identifier information 282, e.g., a connection identifier, identifies the connection to which the timing information 276 corresponds.

Link 1 information 266 includes information corresponding to a connection with WT 1, e.g., connection identification information associating the wireless communications link with a base station attachment point, base station assigned wireless terminal identifier(s) associated with the link, air link resources allocated to that wireless communications link such as downlink and uplink traffic channel segments, user data to be communicated over that wireless communications link, information identifying parameters, e.g., keys, masks, dictionaries, to be used for communications over the link, and/or information indicating parameter switching points for the wireless communications link.

Link N information 268 includes similar information to link 1 information 266, but pertaining to link N.

Figure 3:
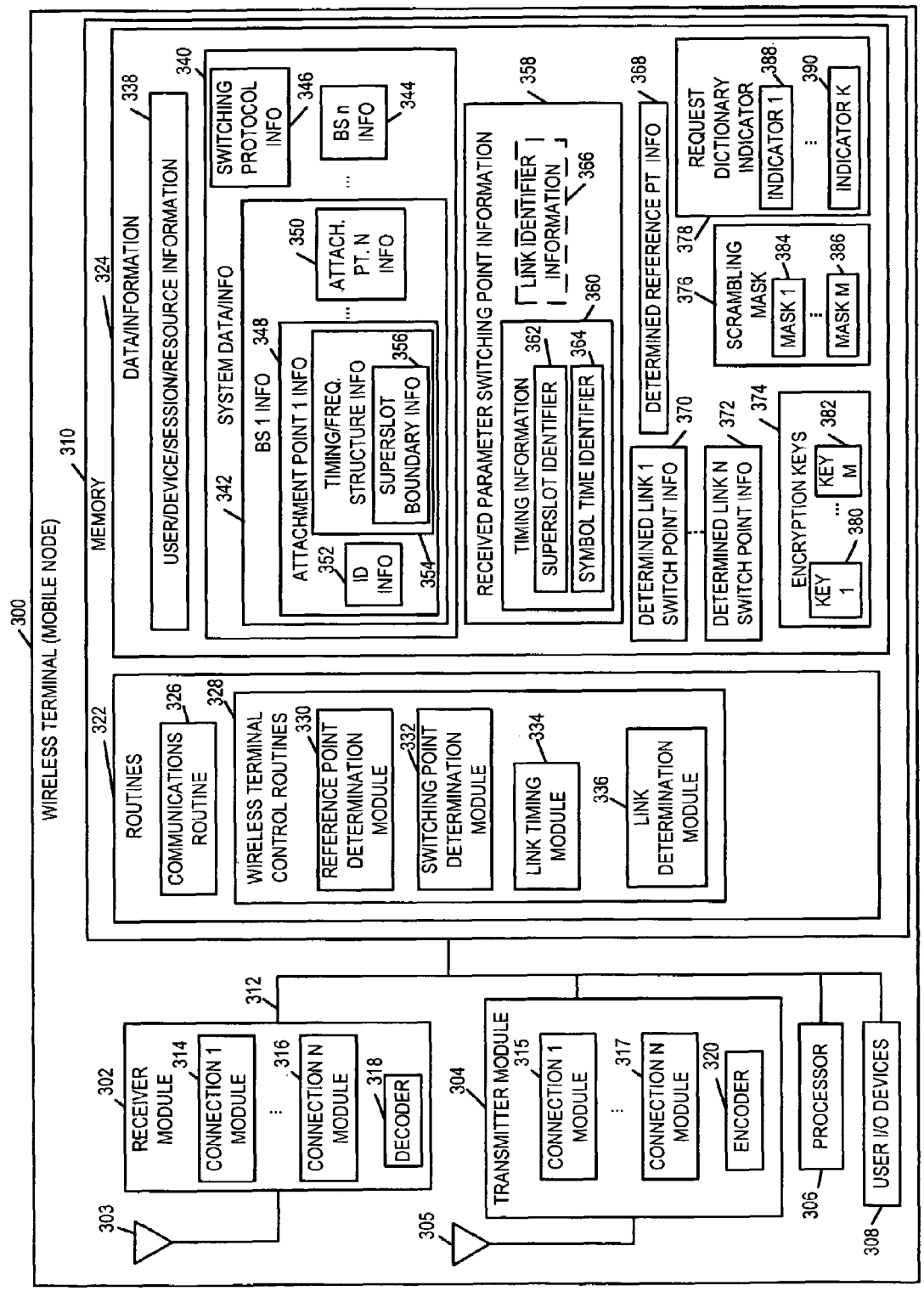
FIG. 3 is a drawing of an exemplary wireless terminal, e.g., mobile node, implemented in accordance with the present invention and using methods of the present invention.

FIG. 3 is a drawing of an exemplary wireless terminal 300, e.g., mobile node, implemented in accordance with the present invention and using methods of the present invention. Exemplary wireless terminal 300 may be any of the wireless terminals (136, 138, 144, 146, 152, 154, 168, 170, 172, 174, 176, 178) of FIG. 1, mobile nodes (MN) 418 of FIG. 4 or MN 718 of FIG. 7. Exemplary wireless terminal 300 includes a receiver module 302, a transmitter module 304, a processor 306, user I/O devices 308, and memory 310 coupled together via a bus 312 over which the various elements interchange data and information.

Receiver module 302, e.g., an OFDM receiver, is coupled to receive antenna 303 via which the wireless terminal receives downlink signals from base stations. Parameter switching point information is received via receiver module 302. The wireless terminal 300 is capable of maintaining simultaneous wireless links with a plurality of base station attachments points. Receiver module 302 includes a plurality of connection modules (connection 1 module 314, . . . , connection N module 316), each connection module can be used for operation pertaining to a different simultaneous downlink link.

In some embodiments, each connection module (314, 316) includes a passband receiver chain tuned to receive the downlink tone block being used by the corresponding attachment point for that link. In some embodiments, a separate antenna is used corresponding to each connection module (314, 316). Receiver 302 also includes decoder module 318 which decodes at least some of the received downlink signals.

Transmitter module 304, e.g., an OFDM transmitter, is coupled to transmit antenna 305 via which the wireless terminal 300 transmits uplink signals to base stations. The wireless terminal 300 is capable of maintaining simultaneous wireless links with a plurality of base station attachments points. Transmitter module 304 includes a plurality of connection modules (connection 1 module 315, . . . , connection N module 317), each connection module can be used for operations pertaining to a different simultaneous uplink link. In some embodiments, each connection module (315, 317) includes a passband transmitter chain tuned to transmit into the uplink tone block being used by the corresponding attachment point for that link. In some embodiments, a separate antenna is used corresponding to each connection module (315, 317). In some embodiments, receiver connection 1 module 314 is paired with transmitter connection 1 module 315, while receiver connection N module 316 is paired with transmitter connection N module 317. The operation between such a pair of modules is, in some embodiments, coordinated such as to adjust wireless terminal uplink timing to synchronize the wireless terminal transmit signals' receive time at the base station attachment point receiver with respect to the receive time of other wireless terminals' transmit signals at the base station attachment point, e.g., using closed loop timing control methods. Received base station downlink signals from the base station attachment point and received timing adjustment feedback signals are used by the wireless terminal. In some embodiments, the same antenna or antennas are used for both the receiver module 302 and transmitter module 304. Transmitter module 304 also includes an encoder module 320 which encodes at least some of the data/information to be communicated using the uplink.

User I/O devices 308, e.g., microphone, keyboard, keypad, camera, switches, speaker, display, etc., provide a user interface allowing the user to input data/information, output data/information, and control operations of the wireless terminal, e.g., initiate a communications session.

Memory 310 includes routines 322 and data/information 324. The processor 306, e.g., a CPU, executes the routines 322 and uses the data/information 324 in memory 310 to control the operation of the wireless terminal 300 and implement methods of the present invention. Routines 322 include a communications routine 326 and wireless terminal control routines 328. The communications routine 326 implements the various communications protocols used by the wireless terminal 300. The wireless terminal control routines 328 include a reference point determination module 330, a switching point determination module 332, a link timing module 334, and a link determination module 336.

Reference point determination module 330 determines from received parameter switching point information, a reference point in time corresponding to a first one of a plurality of wireless communications links between the wireless terminal and base station attachment points.

The switching point determination module 332 determines individual parameter switching points from the determined reference point, each determined individual parameter switching point corresponding to a different one of a plurality of wireless terminal 300 wireless communications links. In some embodiments the switching point determination module 332 determines individual parameter switching points based on a predetermined relationship between the determined reference point and potential parameter switching points for the corresponding one of the wireless terminal 300 wireless communications links. In some embodiments, the switching point determination module 332 selects in a predetermined manner, a potential parameter switching point corresponding to the one of the plurality of wireless communications links for which the individual parameter switching point is being determined. For example, in some embodiments, potential parameter switching points occur on superslot boundaries, and the superslot boundaries are identified from the recurring timing structure corresponding to the link. For example, for each link the switching point determination module 322 in some embodiments, selects the last preceding superslot boundary for the communications link which precedes the determined reference point. In some other embodiments, for each link the switching point determination module 322, selects the next subsequent superslot boundary for the communications link with respect to the determined reference point.

Link timing module 334 maintains timing synchronization on a per link basis. For example, a wireless terminal may have two concurrent links with different base station attachment points, e.g., corresponding to different sectors of the same base station or corresponding to different base stations. The two attachment points are, in some embodiments, not timing synchronized. In addition a link with respect to one attachment point may have a different signal round trip time than another wireless link with respect to a different attachment point. Maintaining timing synchronization at the base station attachment point with respect to each uplink corresponding to the attachment point is important in an OFDM multiple access wireless communications system such as to limit interference levels and closed loop timing control is implemented.

Link determination module 336 determines which one of a plurality of links is the first link to which the communicated switching point offset applies and is being referenced. In some embodiments, the link determination module 336 determines which link is the first link from information included in the received parameter switching information, e.g., link identifier information such as a connection identifier field in a message, the connection identifier field including a cell identifier, a sector type identifier, and a tone block identifier. In other embodiments, the link determination module 336 determines which link is the first link by identifying which link the information was received over, e.g., the link via which the parameter switching information is communicated is the first link.

Data/information 324 includes user/device/session/resource information 338, system data/information 340, received parameter switching point information 358, determined reference point information 368, a plurality of sets of determined link switch point information (determined link 1 switch point information 370, . . . , determined link N switch point information 372), encryption keys 374 (key 1 information 380, . . . , key M information 382), scrambling masks 376 (scrambling mask 1 information 384, . . . , scrambling mask M information 386), and request dictionary indicators (request dictionary indicator 1 information 388, . . . , request dictionary indicator K information 390).

System data/information 340 includes a plurality of set of base station data/information (base station 1 data/information 342, . . . , base station n data 344) and switching protocol information 346. Base station 1 data/information 348 includes a plurality of set of attachment point information (attachment point 1 information 348, . . . , attachment point N information 350). Attachment point 1 information 348 includes identification information 352 and timing/frequency structure information 354. Timing/frequency structure information 354 includes superslot boundary information 356.

Received parameter switching point information 358 includes timing information 360 and, in some embodiments, link identifier information 366. Timing information 360 includes a superslot identifier 362 and a symbol time identifier 364. Determined link reference point information 368 is an output of the reference point determination module 330. Determined link 1 switch point information 1 370 and determined link N switch point information 372 are outputs of the switching point determination module 332. An encryption key is an exemplary parameter which is switched in response to a received switching point information in accordance with the determined switching point corresponding to a particular link and in accordance with the switching protocol information 340. Other exemplary parameters are scrambling masks, e.g., used for scrambling the phase of an OFDM symbol, and request dictionary indicators, e.g., used to indicate different request dictionaries each request dictionary corresponding to a particular interpretation of an uplink traffic resource request report. In some embodiments, the parameter applies to both the uplink and the downlink, e.g., the same encryption key in some embodiments is used for both uplink and downlink traffic channel segments. In some such embodiments, the switching point information is applied in relation to both the downlink and uplink timing structures.

Various elements in the data/information 324 in WT 300 correspond to similarly named elements in the data/information 228 in BS 200, which have been previously described, and such descriptions are also relevant to WT 300.

Figure 4:
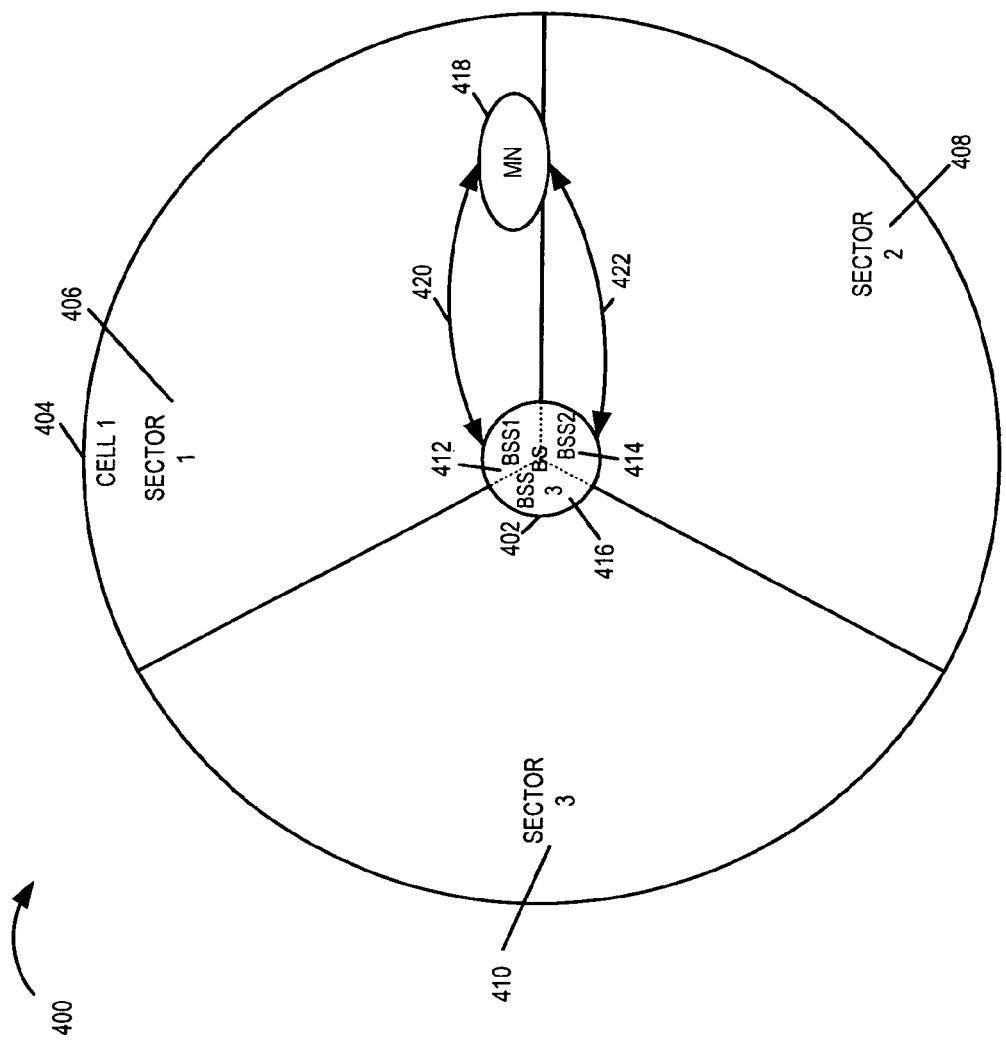
FIG. 4 is a drawing of a portion of an exemplary wireless communications system implemented in accordance with the present invention and using methods of the present invention, used to illustrate various features of the present invention.

FIG. 4 is a drawing 400 of a portion of an exemplary wireless communications system implemented in accordance with the present invention and using methods of the present invention. The exemplary system of drawing 400 includes a base station (BS) 402 having a wireless coverage area represented by cell 1 404. BS 402 includes a plurality of base station sectors (base station sector 1 412, base station sector 2 414, base station sector 3 416) each corresponding to a sector coverage area (sector 1 406, sector 2 408, sector 3 410), respectively. The exemplary system of drawing 400 also includes an exemplary wireless terminal, mobile node (MN) 418. MN 418 is currently connected to a base station sector 1 (BSS1) 412 attachment point as indicated by first wireless communications link 420 and is currently connected to a base station sector 2 (BSS 2) 414 attachment point as indicated by second wireless communications link 422.

Multiple wireless communications links with the same base station sector are also possible. For example, a first wireless communications link can correspond to a first tone block being used by the base station sector and a second wireless communications link can correspond to a different tone block being used by the same base station sector. In some embodiments, a tone block includes a set of contiguous OFDM tones, the set including at least 100 tones, e.g., 113 tones. In some embodiments, each base station sector supports up to three different downlink tone blocks.

Figure 5:
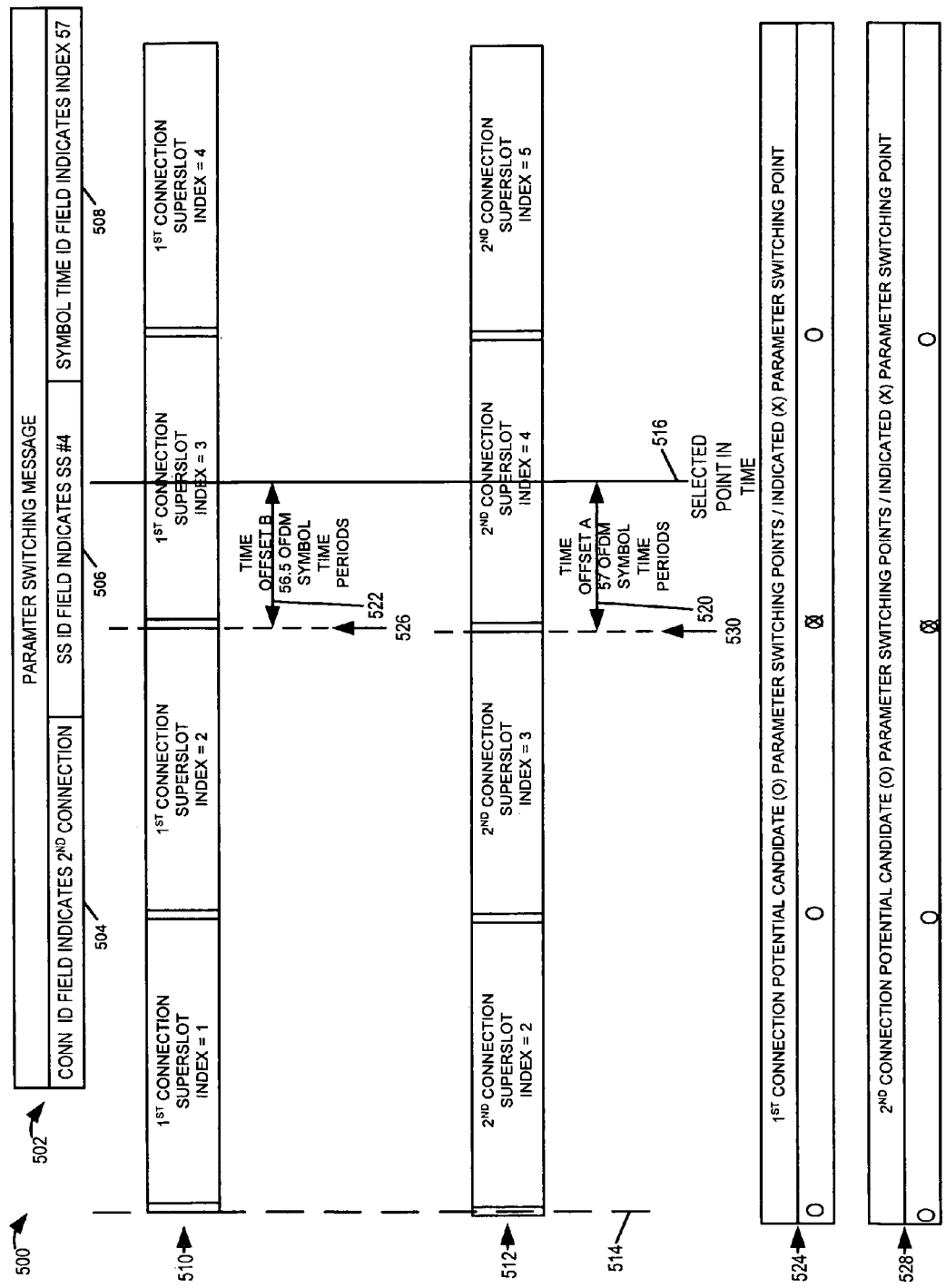
FIG. 5 is a drawing illustrating exemplary parameter switching in accordance with the present invention.

FIG. 5 is a drawing 500 illustrating exemplary parameter switching in accordance with the present invention. Block 502 illustrates an exemplary parameter switching message.

The exemplary parameter switching message 502 includes a connection identifier field 504, a superslot identifier field 506 and a symbol time identifier field 508. In this example, the connector identifier filed 504 indicates that second connection is the connection to which the time offset information of field 506 and field 508 apply. The superslot identifier field 506 indicates superslot with index =4; the symbol time identifier field 508 indicates that the OFDM symbol time index within the superslot is 57. Row 510 illustrates exemplary downlink timing in a repetitive timing structure corresponding to a first connection, e.g., corresponding to wireless communications link 420 in FIG. 4 between BSS1 412 and MN 418. Row 512 illustrates exemplary downlink timing in a repetitive timing structure corresponding to a second connection, e.g., corresponding to wireless communications link 422 in FIG. 4 between BSS2 414 and MN 418. Each superslot, in some embodiments, represents a time duration of a fixed number of OFDM symbol transmission time periods, e.g., 114 OFDM symbol transmission time periods.

Dotted line 514 indicates that the timing representing the start of a superslot is slightly different corresponding to the two simultaneous connections. In addition, in this example, the superslot indexing is offset between the two connections.

In this example, the base station indicates a selected point in time 516 with respect to the second connection via field 504 of message 502. Field 506 of message 502 identifies second connection superslot index=4 as the superslot within the timing structure corresponding to the second connection in which the selected point in time 516 occurs. Field 508 of message 502 indicates that the time offset A 520, from the start of superslot index=4 corresponding to the second connection to the selected point in time 516 is 57 OFDM symbol time periods. Time offset B 522, from the start of the superslot index=3 corresponding to the first connection to the selected point in time 516 is 56.5 OFDM symbol time periods.

Although the value of 522 has not been directly communicated from the base station to the wireless terminal via message 502, there is no ambiguity as to when the parameter switching occurs with respect to the $1^{st}$ connection. The wireless terminal determines a selected point in time 516 with respect to the one connection identified in message 502. For each of the connections, the parameter switching point is the preceding parameter switching boundary. In this case, the parameter switching boundary is the start of a superslot. The base station has intentionally chosen the selected point in time such that there will be no ambiguity as to which boundary each connection should use for the parameter switching point. In some embodiments, for each of the communications links, the selected point in time is offset from each of the intended switching points by at least one OFDM symbol time duration. In some embodiments, the selected point in time is chosen such that the time interval between the selected point in time and the closest potential switching point boundary is maximized or nearly maximized. For example, in this case of FIG. 5, the timing of the two connections is nearly identical with respect to the start of a superslot, and the selected point in time is chosen to be the center point of a superslot corresponding to the $2^{nd}$ connection.

Block 524 indicates $1^{st}$ connection potential candidate parameter switching points indicated by 0s which occur at superslot boundaries corresponding to $1^{st}$ connection timing. Block 524 also indicates that the first connection parameter switching point occurs at the start of superslot with index=3 in the first connection timing, as indicated by an X, time 526.

Block 528 indicates $2^{nd}$ connection potential candidate parameter switching points indicated by 0s which occur at superslot boundaries corresponding to $2^{nd}$ connection timing. Block 528 also indicates that the second connection parameter switching point occurs at the start of superslot with index=4 in the second connection timing, as indicated by an X, time 530. It should be noted that time 530 occurs slightly before time 526; however, there is no ambiguity between the base station sectors and the wireless terminal as to which parameter is used at what time with respect to the different simultaneous links.

Figure 6:
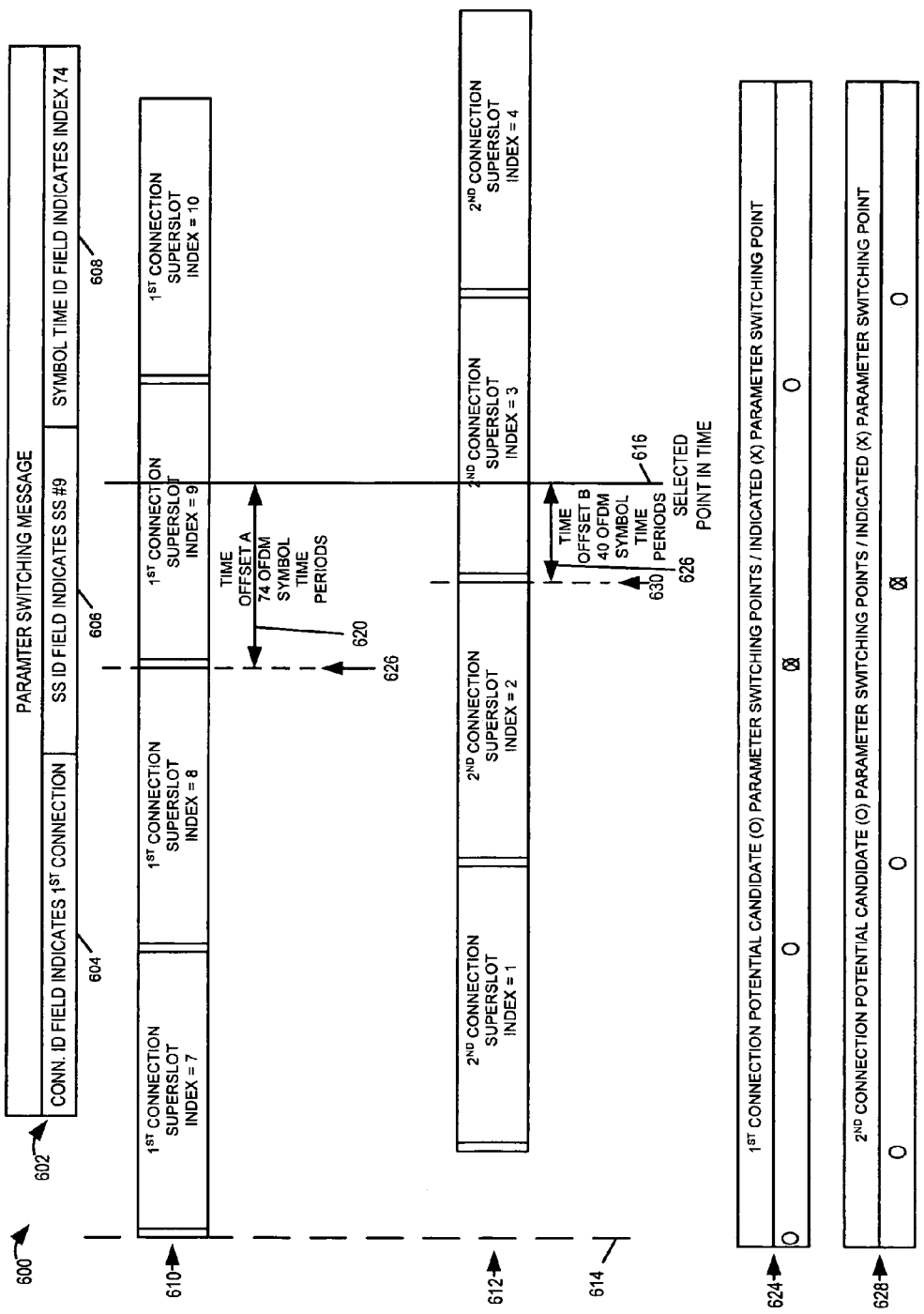
FIG. 6 is another drawing illustrating exemplary parameter switching in accordance with the present invention.

FIG. 6 is a drawing 600 illustrating exemplary parameter switching in accordance with the present invention. Block 602 illustrates an exemplary parameter switching message. The exemplary parameter switching message 604 includes a connection identifier field 604, a superslot identifier field 606 and a symbol time identifier field 608. In this example, the connector identifier field 604 indicates that the first connection is the connection to which the time offset information of fields 606 and field 608 apply. The superslot identifier field 606 indicates superslot with index=9; the symbol time identifier field indicates that the OFDM symbol time index within the superslot is 74. Row 610 illustrates exemplary downlink timing in a repetitive timing structure corresponding to a first connection, e.g., corresponding to wireless communications link 420 in FIG. 4 between BSS1 412 and MN 418. Row 612 illustrates exemplary downlink timing in a repetitive timing structure corresponding to a second connection, e.g., corresponding to wireless communications link 422 in FIG. 4 between BSS2 414 and MN 418. Each superslot, in some embodiments, represents a time duration of a fixed number of OFDM symbol transmission time periods, e.g., 114 OFDM symbol transmission time periods.

Dotted line 614 indicates that the timing representing the start of a superslot is substantially different corresponding to the two simultaneous connections. In addition, in this example, the superslot indexing is offset between the two connections.

In this example, the base station indicates a selected point in time 616 with respect to the first connection via field 604 of message 602. Field 606 of message 602 identifies first connection superslot index=9 as the superslot within the timing structure corresponding to the first connection in which the selected point in time 616 occurs. Field 608 of message 602 indicates that the time offset A 620, from the start of superslot index=9 corresponding to the first connection to the selected point in time 616 is 74 OFDM symbol time periods. Time offset B 622, from the start of the superslot index=3 corresponding to the second connection to the selected point in time 616 is 40 OFDM symbol time periods.

Although the value of time offset B 622 has not been directly communicated from the base station to the wireless terminal via message 602, there is no ambiguity as to when the parameter switching occurs with respect to the $2^{nd}$ connection. The wireless terminal determines a selected point in time 616 with respect to the one connection identified in message 602. For each of the connections, the parameter switching point is the preceding parameter switching boundary. In this case, the parameter switching boundary is the start of a superslot. The base station has intentionally chosen the selected point in time such that there will be no ambiguity as to which boundary each connection should use for the parameter switching point. In some embodiments, for each of the communications links, the selected point in time is offset from each of the intended switching points by at least one OFDM symbol time duration. In some embodiments, the selected point in time is chosen such that the time interval between the selected point in time and the closest potential switching point boundary is maximized or nearly maximized.

Block 624 indicates 1$^{st}$ connection potential candidate parameter switching points indicated by 0s which occur at superslot boundaries corresponding to 1$^{st}$ connection timing. Block 624 also indicates that the first connection parameter switching point occurs at the start of superslot with index=9 in the first connection timing, as indicated by an X, time 626.

Block 628 indicates 2$^{nd}$ connection potential candidate parameter switching points indicated by 0s which occur at superslot boundaries corresponding to 2$^{nd}$ connection timing. Block 628 also indicates that the second connection parameter switching point occurs at the start of superslot with index=3 in the second connection timing, as indicated by an X, time 630.

Figure 7:
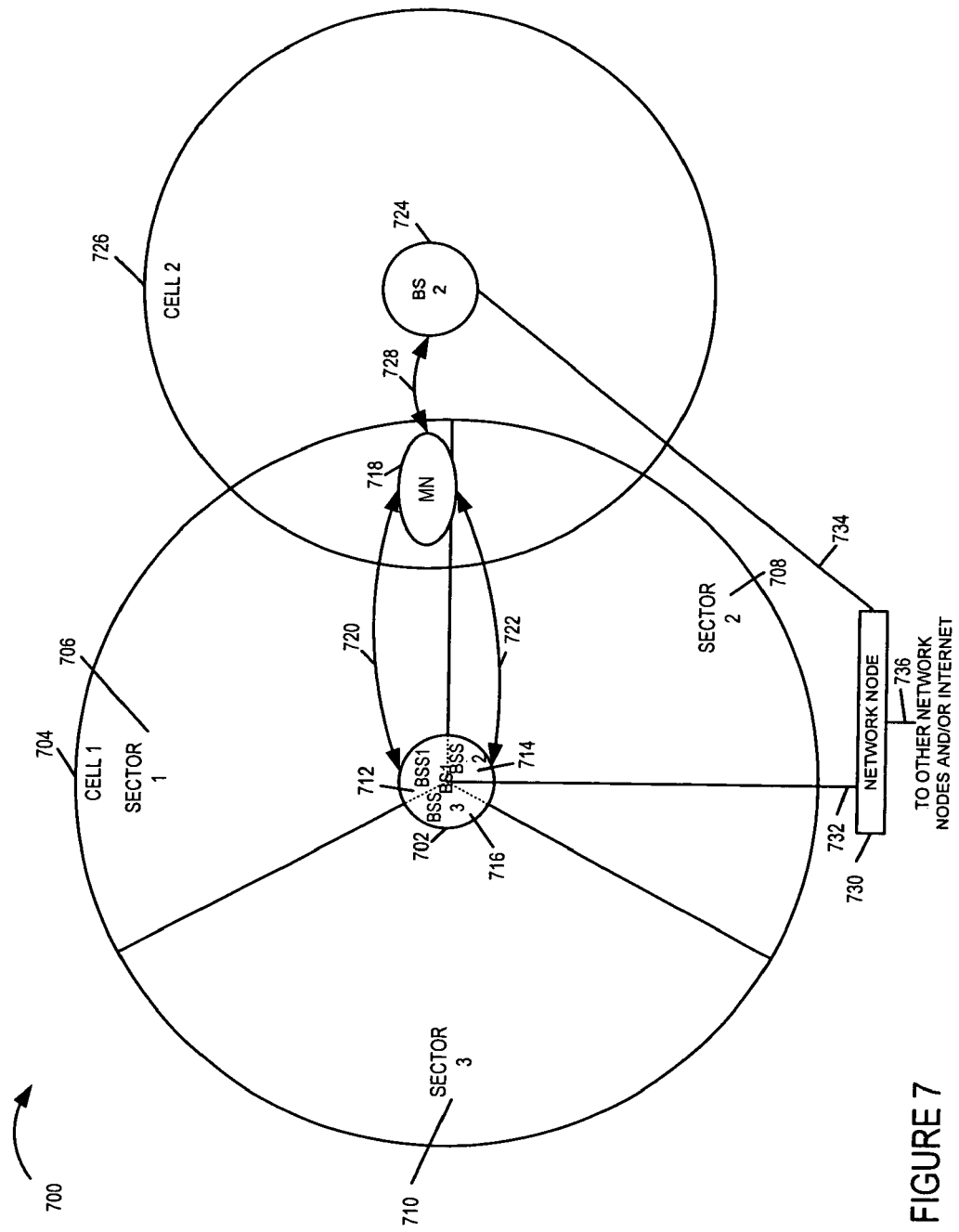
FIG. 7 is a drawing of an exemplary wireless communications system implemented in accordance with the present invention and using methods of the present invention.

FIG. 7 is a drawing of an exemplary wireless communications system 700 implemented in accordance with the present invention and using methods of the present invention. The exemplary system 700 includes a first base station (BS 1) 702 having a wireless coverage area represented by cell 1 704. BS 702 includes a plurality of base station sectors (base station sector 1 712, base station sector 2 714, base station sector 3 716) each corresponding to a sector coverage area (sector 1 706, sector 2 708, sector 3 710), respectively. The exemplary system 700 also includes an exemplary wireless terminal, mobile node (MN) 718. MN 718 is currently connected to a base station sector 1 (BSS1) 712 attachment point as indicated by first wireless communications link 720 and is currently connected to a base station sector 2 (BSS 2) 714 attachment point as indicated by second wireless communications link 722.

Exemplary wireless communications system 700 also includes a second base station, BS 2 724 having a wireless coverage area represented by cell 2 726. For example, base station 724 represents a single base station sector which is used throughout the entire cell 726. Mobile Node 718 is also currently connected to a BS 2 attachment point as indicated by third wireless communications link 728.

BS 1 702 and BS 2 724 are coupled to network node 730, e.g., a router, a control node, etc, via network links (732, 734), respectively. Network node 730 is also coupled to other network nodes, e.g., other base stations, routers, AAA nodes, home agent nodes, etc., via network link 736. Network links (732, 734, 736) are, e.g., fiber optic links.

In some embodiments, the base stations (704, 706) may have different numbers of base station sectors, e.g., two, four, or more than four sectors. In some embodiments, at least some of the base station sectors support a plurality of different tone blocks, e.g., three different downlink tones blocks, each of the different downlink tone block associated with a corresponding different uplink tone block. For example, BSS1 712 may support three different downlink tone blocks and/or carriers, and each downlink tone block may correspond to a different potential BSS 1 attachment point. In such an exemplary embodiment, a wireless terminal may have multiple simultaneous connections with the same base station sector but use different tone blocks corresponding to each connection. In some embodiments, multiple base stations are co-located at a site. For example, a first base station using a first downlink carrier may be co-located with a second base station using a second downlink carrier, the second downlink carrier being different that the first downlink carrier.

Figure 8:
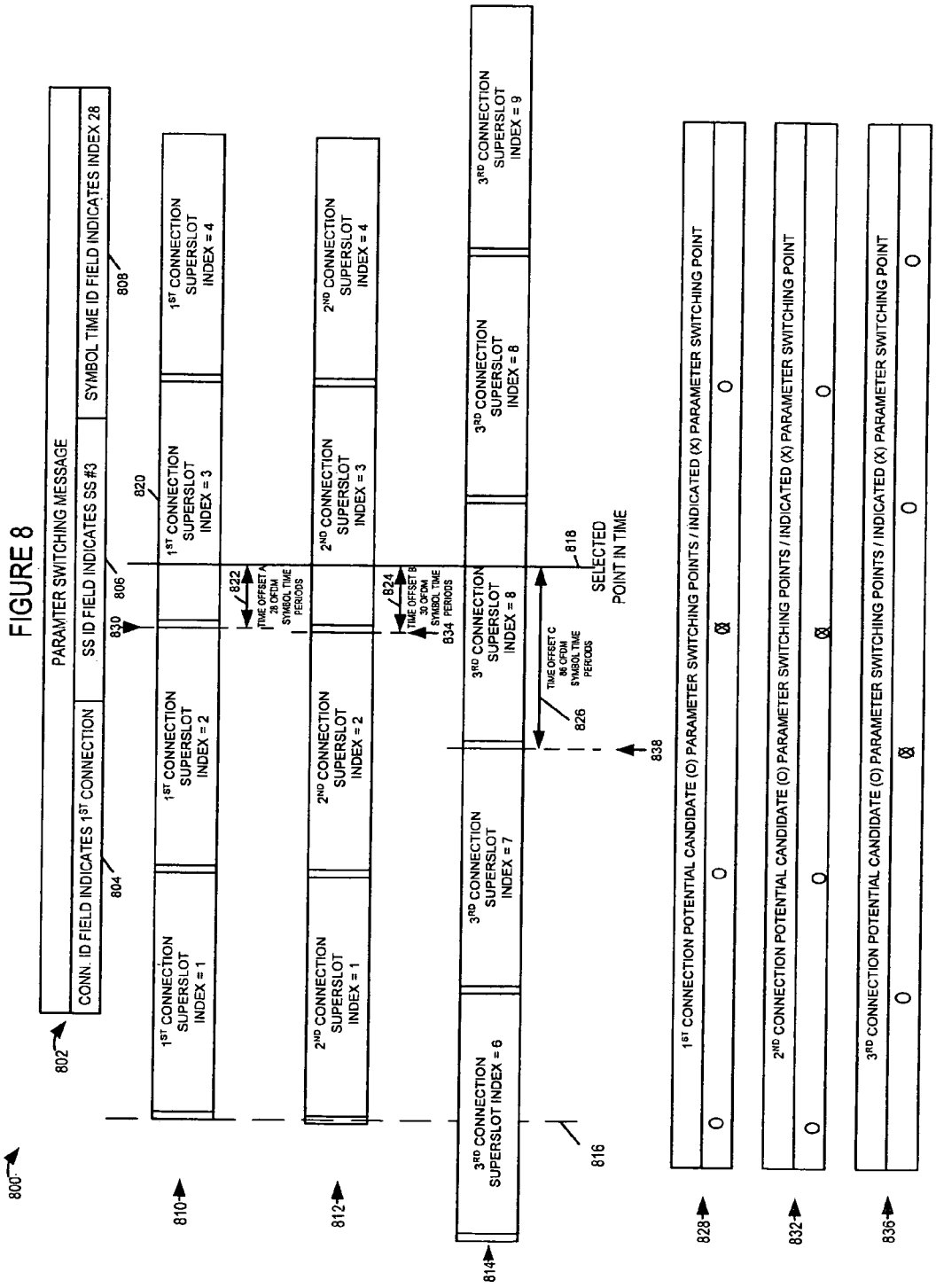
FIG. 8 is a drawing illustrating exemplary parameter switching in accordance with the present invention.

FIG. 8 is a drawing 800 illustrating exemplary parameter switching in accordance with the present invention. Block 802 illustrates an exemplary parameter switching message. The exemplary parameter switching message 804 includes a connection identifier field 804, a superslot identifier field 806 and a symbol time identifier field 808. In this example, the connector identifier field 804 indicates that the first connection is the connection to which the time offset information of fields 806 and field 808 apply. The superslot identifier field 806 indicates superslot with index=3; the symbol time identifier field 808 indicates that the OFDM symbol time index within the superslot is 28. Row 810 illustrates exemplary downlink timing in a repetitive timing structure corresponding to a first connection, e.g., corresponding to wireless communications link 720 in FIG. 7 between BSS1 712 and MN 718. Row 812 illustrates exemplary downlink timing in a repetitive timing structure corresponding to a second connection, e.g., corresponding to wireless communications link 722 in FIG. 7 between BSS2 714 and MN 718. Row 814 illustrates exemplary downlink timing in a repetitive timing structure corresponding to a third connection, e.g., corresponding to wireless communications link 728 in FIG. 7 between BS 2 724 and MN 718. Each superslot, in some embodiments, represents a time duration of a fixed number of OFDM symbol transmission time periods, e.g., 114 OFDM symbol transmission time periods.

Dotted line 816 indicates that the timing representing the start of a superslot is slightly different corresponding to simultaneous connections 1 and 2 and substantially different corresponding to the two simultaneous connections 1 and 3. In addition, in this example, the superslot indexing is offset between the first and third connections.

In this example, the base station indicated selected point in time 818 corresponding to message 802 is with respect to the first connection via field 804 of message 802. Field 806 of message 802 identifies first connection superslot index=3 as the superslot within the timing structure corresponding to the first connection in which the selected point in time 818 occurs. Field 808 of message 802 indicates that the time offset A 822, from the start of superslot index=3 corresponding to the first connection to the selected point in time 818 is 28 OFDM symbol time periods. Time offset B 824, from the start of the superslot index=3 corresponding to the second connection to the selected point in time 818 is 30 OFDM symbol time periods. Time offset C 826, from the start of the superslot index=8 corresponding to the third connection to the selected point in time 818 is 86 OFDM symbol time periods.

Although the value of time offset B 824 and the value of time offset C 826 have not been directly communicated from the base station to the wireless terminal via message 802, there is no ambiguity as to when the parameter switching occurs with respect to the 2$^{nd}$ connection or the 3$^{rd}$ connection. The wireless terminal determines a selected point in time 818 with respect to the one connection identified in message 802. For each of the connections, the parameter switching point is the preceding parameter switching boundary. In this case, the parameter switching boundary is the start of a superslot. The base station has intentionally chosen the selected point in time 818 such that there will be no ambiguity as to which boundary each connection should use for the parameter switching point. In some embodiments, for each of the communications links, the selected point in time is offset from each of the intended switching points by at least one OFDM symbol time duration. In some embodiments, the selected point in time is chosen such that the time interval between the selected point in time and the closest potential switching point boundary is maximized or nearly maximized.

Block 828 indicates 1$^{st}$ connection potential candidate parameter switching points indicated by 0s which occur at superslot boundaries corresponding to 1$^{st}$ connection timing. Block 828 also indicates that the first connection parameter switching point occurs at the start of superslot with index=3 in the first connection timing, as indicated by an X, time 830.

Block 832 indicates $2^{nd}$ connection potential candidate parameter switching points indicated by 0s which occur at superslot boundaries corresponding to $2^{nd}$ connection timing. Block 832 also indicates that the 2nd connection parameter switching point occurs at the start of superslot with index=3 in the second connection timing, as indicated by an X, time 834.

Block 836 indicates $3^{rd}$ connection potential candidate parameter switching points indicated by 0s which occur at superslot boundaries corresponding to $3^{rd}$ connection timing. Block 836 also indicates that the $3^{rd}$ connection parameter switching point occurs at the start of superslot with index=8 in the second connection timing, as indicated by an X, time 838.

Figure 9:
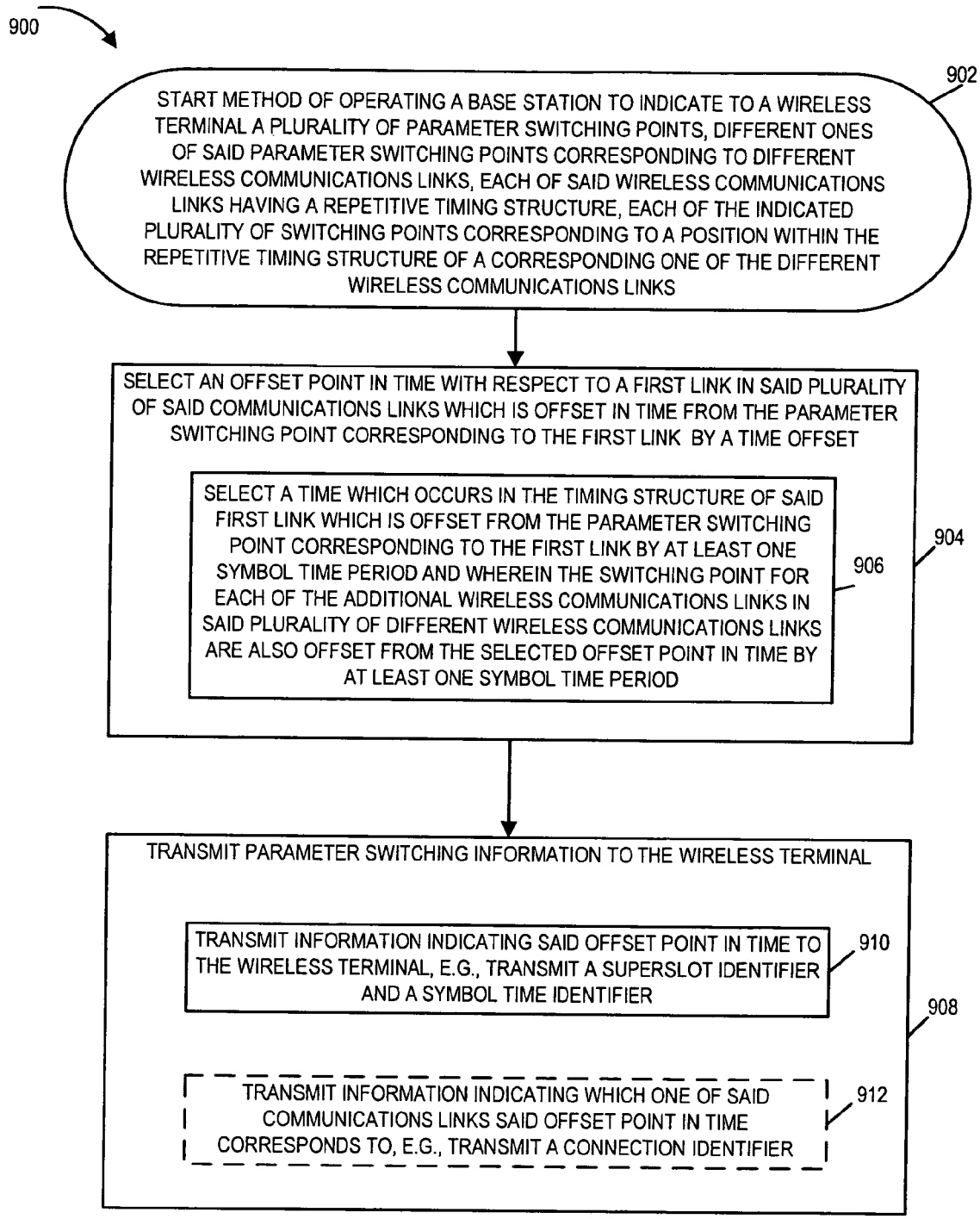
FIG. 9 is a flowchart of an exemplary method of operating a base station in accordance with the present invention.

FIG. 9 is a flowchart 900 of an exemplary method of operating a base station in accordance with the present invention. Flowchart 900 illustrates an exemplary method of operating a base station to indicate to a wireless terminal, a plurality of parameter switching points, different ones of said parameter switching points corresponding to different wireless communications links, each of said wireless communications links having a repetitive timing structure, each of the indicated plurality of switching points corresponding to a position within the repetitive timing structure of a corresponding one of the different wireless communications links. In some embodiments, the plurality of communications links are downlink communications links and the downlink timing structure is the same for each of the wireless links. In some embodiments, the plurality of communications links are asynchronous communications links. In some embodiments, the plurality of parameter switching points corresponding to different links represent switching points for the same parameter. Examples of parameters corresponding to a switching point parameter include an encryption key, a request dictionary indicator and a scrambling mask. Operation of the exemplary method starts in step 902 and proceeds to step 904.

In step 904, the base station selects an offset point in time with respect to a first link of said communications links which is offset in time from the parameter switching point corresponding to said first link by a time offset. In some embodiments, the symbol time is a time period used to transmit an OFDM symbol. In some embodiments, the parameter switching points for said plurality of communications links are limited to occur at pre-selected timing boundaries within the recurring timing structures of said plurality of communications links. In some such embodiments, the pre-selected timing boundaries occur at fixed time spacings. For example, in some embodiments the pre-selected timing boundaries are superslot boundaries which are spaced apart by at least 101 OFDM symbol transmission time periods, e.g., 114 OFDM symbol transmission time periods. In various embodiments, the pre-selected timing boundaries for each of the wireless links are offset from one another, e.g., the superslot boundaries of different communications links are offset from one another. In some embodiments, each switching point corresponding to each of said different communications links has a predetermined relationship to the selected offset point in time. For example, the predetermined relationship is that, for each of said different communications links the switching point for that wirelesses link is a potential switching point for that wireless link immediately preceding the selected offset point in time, e.g., a superslot boundary, immediately preceding the selected offset point in time.

Step 904 includes sub-step 906. In sub-step 906, the base station selects a time which occurs in the timing structure of said first link which is offset from the parameter switching point corresponding to the first one link by at least one symbol time period and wherein the switching point in time for each of the additional wireless communications links in said plurality of different wireless communications links are also offset from the selected offset point in time by at least one symbol time period. Operation proceeds from step 904 to step 908.

In step 908, the base station transmits parameter switching information to the wireless terminal. Step 908 includes sub-step 910. In sub-step 910, the base station transmits information indicating said offset point in time to the wireless terminal. For example, in some embodiments, the base station transmits a superslot identifier, and a symbol time identifier. In some embodiments, the transmitting of sub-step 910 is performed at a point in time, prior to said selected offset point in time, which precedes said switching point corresponding to the first one link by at least 5 times the period between potential switching points in the repetitive timing structure of the first link. In some such embodiments, the transmitting of step 910 is performed at a point in time, prior to said selected offset point in time, that precedes each of said switching points corresponding to different ones of said different communications links by at least 5 times the period between potential switching points in the repetitive timing structure being used for the link corresponding to particular repetitive timing structure. In some embodiments, the generated switching point information which is transmitted corresponds to a switching point time for the first link at least 40 superslots into the future. In some such embodiments, e.g., wherein there are 144 superslots in an ultraslot, the generated switching point information which is transmitted corresponds to a switching point time for the first link at most 143 superslots into the future.

In some embodiments, transmitting information indicating said offset point in time includes transmitting said information indicating said offset point in time over the first link to which said offset point in time corresponds without transmitting express information identifying which one of said plurality of links said offset point in time corresponds to, e.g., sub-step 912 is not performed.

In some other embodiments, step 908 includes sub-step 912. In sub-step 912, the base station transmits information indicating which one of said communications links said offset point in time corresponds to. For example, the base station transmits a connection identifier. In various embodiments, sub-step 910 and sub-step 912 are transmitted as part of the same message, e.g., a message including a connection identifier, a superslot identifier, and a symbol time identifier.

Figure 10:
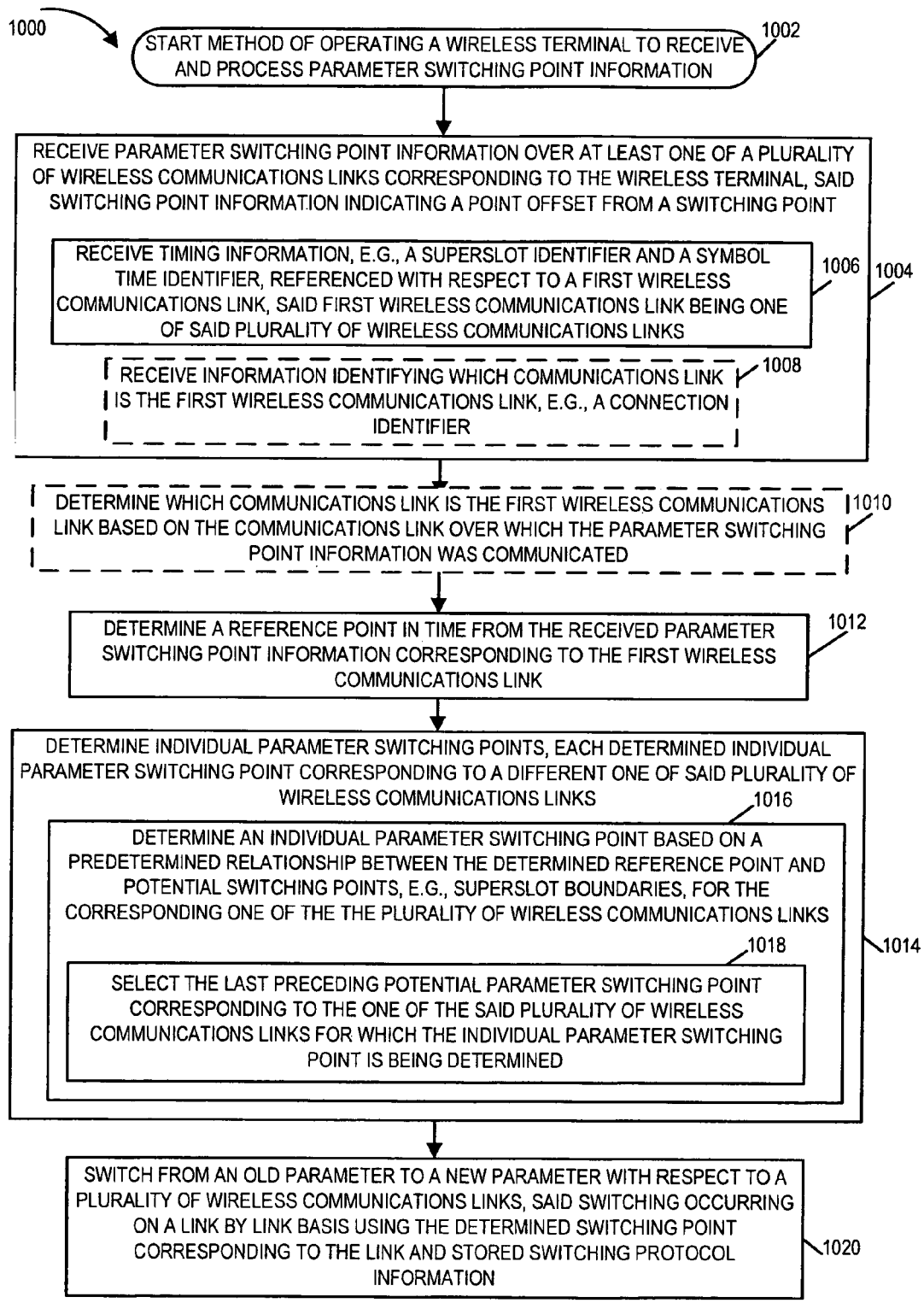
FIG. 10 is a flowchart of an exemplary method of operating a wireless terminal to receive and process parameter switching point information in accordance with the present invention.

FIG. 10 is a flowchart 1000 of an exemplary method of operating a wireless terminal to receive and process parameter switching point information in accordance with the present invention. Operation starts in step 1002, where the wireless terminal is powered on and initialized. Operation proceeds from start step 1002 to step 1004. In step 1004, the wireless terminal receives parameter switching point information over at least one of a plurality of wireless communications links corresponding to the wireless terminal, said switching point information indicating a point offset from a switching point. Step 1004 includes sub-step 1006. In sub-step 1006, the wireless terminal receives timing information, e.g., a superslot identifier and a symbol time identifier, referenced with respect to a first wireless communication link, said first wireless communications link being one of said plurality of wireless communications links. In some embodiments, step 1004 includes sub-step 1008. In sub-step 1008, the wireless terminal receives information identifying which communication link is the first wireless communication link. For example, a connection identifier is, in some embodiments, communicated to the wireless terminal along with the timing information.

In some embodiment, e.g., embodiments, where sub-step 1008 is not included, operation proceeds from step 1004 to step 1010. In other embodiments, where sub-step 1008 is performed and step 1010 is not performed, operation proceeds from step 1004 to step 1012.

In step 1010, the wireless terminal determines which communications link is the first wireless communications link based on the communications link over which the parameter switching point information was communicated. For example, in some embodiments, the communications link over which the parameter switching point information is communicated is the first communications link. Operation proceeds from step 1010 to step 1012.

In step 1012, the wireless terminal determines a reference point in time from the received parameter switching point information corresponding to the first communications link. Operation proceeds from step 1012 to step 1014.

In step 1014, the wireless terminal determines individual parameter switching points, each determined individual parameter switching point corresponding to a different one of said plurality of wireless communications links. Step 1014 includes sub-step 1014, which is performed for each of the plurality of wireless communications links. In sub-step 1016, the wireless terminal determines an individual parameter switching point based on a predetermined reference between the determined reference point and potential switching points, e.g., superslot boundaries, for the corresponding one of the plurality of wireless communications links. Sub-step 1016 includes sub-step 1018. In sub-step 1018, the wireless terminal selects the last preceding potential parameter switching point corresponding to the one of said plurality of wireless communications links for which the individual parameter switching point is being determined. Operation proceeds from step 1014 to step 1020.

In step 1020, the wireless terminal switches from an old parameter to a new parameter with respect to a plurality of wireless communications links, said switching occurring on a link by link basis using the determined switching point corresponding to the link and stored switching protocol information. For example, consider that potential parameter switching points occur on superslot boundaries, and that the timing structure with respect to superslot boundaries on each of the plurality of links is offset from one another, the determined parameter switching points will be offset from one another. In addition consider that the parameter which is to be switched from an old to new parameter is an encryption key, and that the stored switching protocol information calls for a coded traffic channel segment to be coded using a single encryption key. Consider the following exemplary switching protocol rules which are used in some embodiments. For a given link, if the segment is downlink segment which ends before or at the parameter switching point the old key is used for the segment; if a segment is a downlink segment which ends after the parameter switching point the new key is used. For the given link, if the segment is uplink segment which starts before the switching point the old key is used for the segment; if a segment is a uplink segment which starts on or after the parameter switching point the new key is used.

An exemplary embodiment of the present invention will now be described. This section addresses issues relating to wireless terminal-base station (WT-BS) synchronization involving activation of a new cipher key following or as part of completion of a Security Association Protocol (SAP) exchange. This processing applies, in some embodiments, to whenever a SAP phase is undertaken, whether on power-up or handoff.

In the exemplary embodiment, the last message of the SAP exchange is a SAP.SecurityConfirm message, which the BS sends to the WT. This message includes a field "KeySyncInfo", which carries the information to be used as a reference for changing over to the newly negotiated cipher and/or authentication key called "AirlinkCipherKey" and "AirlinkIntegrityKey", respectively. In some embodiments, the AirlinkIntegrityKey is not used and may be omitted. The description below refers to the use of the AirlinkCipherKey.

A WT may transmit and/or receive data over one or more wireless airlink connections that are part of the same link, e.g., a link layer link. The same AirlinkCipherKey is used for data protection over each of the connections of the same link, except for a short time interval while the encryption key is being switched, during which both the old key and the new key may be in use simultaneously. Encryption/decryption is applied to each traffic channel segment of each connection independently. Each segment can be identified in time by a superslot index. which can be implemented using a wrap-around counter. Thus, the superslot index is a value which wraps around after a predetermined number of time slots. In this exemplary embodiment, a superslot is a timing structure in a recurring timing structure that is being used for a connection, In one embodiment a superslot includes a fixed number, e.g., 114, contiguous indexed OFDM symbol transmission time periods, e.g., with the index number ranging from 0 to 113. In some embodiments superslots are indexed in a larger grouping of OFDM symbol transmission time periods. For example in one exemplary embodiment, the larger grouping is an ultraslot, said ultrastlot including a fixed number of indexed superslots, e.g., 144 indexed superslots, e.g., with the index value ranging from 0 to 143. The indexing of the superslots repeats from one ultraslot to the next ultraslot.

Consider one of the connections. The encryption/decryption key will change at the beginning of a "key-change" superslot. To each traffic channel segment, the key-change superslot is assigned as follows. To each uplink traffic channel segment, the key-change superslot is assigned to be the one at which the segment starts. To each downlink traffic channel segment, the key-change superslot is the one at which the segment ends. Which key is used for encryption/decryption of a traffic channel segment will depend on the superslot assigned to that segment. Thus, for each connection, the information used to identify when the new key is to be applied includes a superslot index, say "X". If a traffic channel segment has an assigned superslot which is before the next superslot with index "X" after SAP.SecurityConfirm message was received, the old key is used to encrypt/decrypt that segment. If a traffic channel segment has an assigned superslot which is the next superslot with index "X" after SAP.SecurityConfirm message was received or a later superslot, the new key is used to encrypt/decrypt that segment. The computation of the superslot index "X" for each connection from the KeySyncInfo field is addressed below.

The KeySyncInfo field is 4-byte long and is composed of the following values (connection ID value, superslot counter (ctr) value, symbol counter value), which are concatenated in the order shown and described below.

| KeySyncInfo format |
|---|

```
Body:
 0                   1                   2                   3
 0 1 2 3 4 5 6 7 8 9 0 1 2 3 4 5 6 7 8 9 0 1 2 3 4 5 6 7 8 9 0 1
```

| CID | Superslot Ctr | Symbol Ctr |
|---|---|---|

The KeySyncInfo field includes a two byte connection identification (CID) field followed by a 1 byte Superslot counter field followed by a 1 byte Symbol counter field. The two byte CID is the CID of the connection which the two counters following the CID refer to. The 1 byte superslot counter is the Superslot counter within ultraslot, i.e., the index of the superslot at the beginning of which the key change is to take place for this connection. Sometimes this counter is referred to as "UltraslotSuperslotIndex". The 1 byte symbol counter is the Symbol counter within the superslot, i.e. the index of a symbol in the superslot, which allows computation of the superslot number when the key change is to take place for each of the other connections under the same link. Sometimes this counter is referred to as "SuperslotOFDMSymbolIndex".

A value of 255 in both subfields "Superslot Ctr" and "Symbol Ctr" is used to indicate that the encryption key is to be switched by the WT immediately upon receiving SAP.SecurityConfirm message. This setting is used when the SAP exchange is done as part of the network access operation, i.e. when the WT has no previous key with this BS.

The key-change superslot index "X" is computed in the exemplary embodiment from the KeySyncInfo field as follows:

(1) For the connection with the CID conveyed in the first value field of the KeySyncInfo field (named "C0"), superslot "X0" is the superslot counter (i.e. second value) in the KeySyncInfo field.

(2) For each additional connection "Ci", if its symbol "Yi" of superslot "Si" aligns in time with connection "C0"'s symbol 0 of superslot 0, then $Xi=mod(X0+Si+floor((Y0+Yi)/SS\_SYMBOLS), US\_SUPERSLOTS)$, where "Y0" is the symbol counter in the KeySyncInfo field, SS_SYMBOLS is the total number of symbols in a superslot, and US_SUPERSLOTS is the total number of superslots in an ultraslot. In some embodiments, SS_SYMBOLS=114 and US_SUPERSLOTS=144.

Note that, in some embodiments, there can be an ambiguity of 1 in the value of Yi in the second bullet above, as the symbols of the two connections may not exactly align. To deal with this case, the base station chooses the symbol counter subfield so that the ambiguity is irrelevant, i.e. so that the same Xi results whether any of the possible Yi's is assumed by the WT. In addition, the base station generates the KeySyncInfo to correspond to a time at least a sufficient number of superslots, e.g., 40 superslots, into the future to ensure that the WT will successfully receive the SAP.SecurityConfirm message before the time to switch the key has come. The base station generates a KeySyncInfo to correspond to a time at most US_SUPERSLOTS—1 into the future. For example the base station generates a KeySyncInfo to correspond to a time at most 143 superslots into the future in an exemplary embodiment where there are 144 superslots per ultraslot.

An example of computation of the superslot index "X" is described below below. The 2 byte CID field includes an unsigned integer value which is associated with connection 0, the superslot counter field includes an unsigned integer value =102, and the symbol counter field includes and unsigned integer value =21.

Assume that SS_SYMBOLS=114, US_SUPERSLOTS=144, and that another connection C1 aligns with the named connection C0 as follows: Symbol Y1=99 of superslot S1=36 aligns with C0's symbol 0 of superslot 0. From the KeySyncInfo, X0=102 and Y0=21. Then to compute the superslot X1, $X1=mod(102+36+floor((21+99)/114), 144) =139$.

Thus, for connection C1, the new key is applied starting with the next superslot number 139.

In accordance with the present invention, a base station generates the KeySyncInfo and communicates the information to the wireless terminal. The generation method including selecting a symbol counter value such that there will be no ambiguity at the wireless terminal when deciding where new key application occurs with respect to each of the one or more connections corresponding to the same link. The wireless terminal receives and processes the communicated KeySyncInfo determining when the new key is started with respect to each of the one or more connections corresponding to the same link.

The techniques of the present invention may be implemented using software, hardware and/or a combination of software and hardware. The present invention is directed to apparatus, e.g., mobile nodes such as mobile terminals, base stations, communications system which implement the present invention. It is also directed to methods, e.g., method of controlling and/or operating mobile nodes, base stations and/or communications systems, e.g., hosts, in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

While described in the context of an OFDM system, at least some of the methods and apparatus of the present invention, are applicable to a wide range of communications systems including many non-OFDM and/or non-cellular systems.

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method of operating wireless terminal to receive and process parameter switching point information, the method comprising:
   receiving parameter switching point information over at least one of a plurality of wireless communications links corresponding to the wireless terminal, said switching point information indicating a point offset from a switching point;
   determining a reference point in time from the received parameter switching point information corresponding to a first wireless communications link, said first wireless communications link being one of said plurality of wireless communications links; and
   determining individual parameter switching points, the determined individual parameter switching points corresponding to different ones of said plurality of wireless communications links.

2. The method of claim 1, wherein determining individual parameter switching points is based on a predetermined relationship between the determined reference point and potential parameter switching points for the corresponding one of said plurality of wireless communications links.

3. The method of claim 2, wherein said determining individual parameter switching points includes using a function to determine said individual parameter switching points, said function being implemented in accordance with said predetermined relationship and using modular arithmetic computation.

4. The method of claim 2, wherein said determining of an individual parameter switching point includes selecting the last preceding potential parameter switching point corresponding to the one of said plurality of wireless communications links for which an individual parameter switching point is being determined.

5. The method of claim 4, wherein potential parameter switching points are super slot boundaries.

6. The method of claim 2, wherein the step of receiving parameter switching information includes receiving timing information referenced with respect to the first wireless communications link.

7. The method of claim 6, wherein said received timing information includes a superslot identifier and a symbol time identifier.

8. The method of claim 6, wherein receiving parameter switching information includes receiving information identifying which communications link is the first wireless communications link.

9. The method of claim 8, wherein the information identifying which communications link is the first wireless communications link includes a connection identifier.

10. The method of claim 1, wherein the step of receiving parameter switching information includes receiving timing information referenced with respect to a first wireless communications link, said first wireless communications link.

11. The method of claim 6, further comprising: determining which communications link is the first communications link to which the received timing information corresponds based on the communications link over which the timing information was received.

12. The method of claim 1, further comprising: switching from using an old parameter to a new parameter with respect to a plurality of communications links, said switching occurring on a link by link basis using the determined switching point corresponding to the link and stored switching protocol information.

13. The method of claim 9, wherein said parameter is an encryption parameter, said switching occurring on each link at points in time corresponding to encryption boundaries where said encryption parameter is permitted to change.

14. The method of claim 2, wherein the parameter is one of an encryption key, a request dictionary indicator, and a scrambling mask.

15. The method of claim 14, wherein said parameter is used for both an uplink and a downlink.

16. A wireless terminal, comprising:
    a receiver for receiving parameter switching point information over at least one of a plurality of wireless communications links corresponding to the wireless terminal, said switching point information indicating a point offset from a switching point;
    a reference point determination module for determining, from the received parameter switching point information, a reference point in time corresponding to a first one of said plurality of communications links; and
    a switching point determination module for determining individual parameter switching points from said determined reference point, each determined individual parameter switching point corresponding to a different one of said plurality of wireless communications links.

17. The wireless terminal of claim 16, wherein said switching point determination module determines individual parameter switching points is based on a predetermined relationship between the determined reference point and potential parameter switching points for the corresponding one of said plurality of wireless communications links.

18. The wireless terminal of claim 17, wherein said determining individual parameter switching points includes using a function to determine said individual parameter switching points, said function being implemented in accordance with said predetermined relationship and using modular arithmetic computation.

19. The wireless terminal of claim 17, further including: stored information indicating potential parameter switching points in a recurring communication link timing structure; and wherein said switching point determination module selects, in a predetermined manner, a potential parameter switching point corresponding to the one of said plurality of wireless communications links for which an individual parameter switching point is being determined.

20. The wireless terminal of claim 19, wherein potential parameter switching points are super slot boundaries and wherein the predetermined manner includes selecting the last preceding superslot boundary occurring in the communications link preceding said reference point.

21. The wireless terminal of claim 17, wherein said parameter switching information includes timing information referenced with respect to a first wireless communications link, said first wireless communications link being one of said plurality of communications links, said received timing information includes a superslot identifier and a symbol time identifier.

22. The wireless terminal of claim 21, further comprising: a link timing module for maintaining timing synchronization on a per link basis.

23. The wireless terminal of claim 19, further comprising: a link determination module for determining which one of said plurality of links is the first link.

24. The wireless terminal of claim 23 wherein said link determination module determines which one of said plurality of links is the first link from link identification information included with said received parameter switching information.

25. The wireless terminal of claim 23 wherein said link determination module determines which one of said plurality of links is the first link based on which link said received parameter switching information was communicated to the wireless terminal.

26. The wireless terminal of claim 23, wherein the parameter is one of an encryption key, a request dictionary indicator, and a scrambling mask.

27. A wireless terminal, comprising:
means for receiving parameter switching point information over at least one of a plurality of wireless communications links corresponding to the wireless terminal, said switching point information indicating a point offset from a switching point;
means for determining, from the received parameter switching point information, a reference point in time corresponding to a first one of said plurality of communications links; and
means for determining individual parameter switching points from said determined reference point, each determined individual parameter switching point corresponding to a different one of said plurality of wireless communications links.

28. The wireless terminal of claim 27, wherein said means for determining individual parameter switching points determines individual parameter switching points based on a predetermined relationship between the determined reference point and potential parameter switching points for the corresponding one of said plurality of wireless communications links.

29. The wireless terminal of claim 28, wherein said means for determining individual parameter switching points uses a function to determine said individual parameter switching points, said function being implemented in accordance with said predetermined relationship and using modular arithmetic computation.

30. The wireless terminal of claim 28, further including:
stored information indicating potential parameter switching points in a recurring communication link timing structure; and
wherein said means for determining individual parameter switching points determines in a predetermined manner, a potential parameter switching point corresponding to the one of said plurality of wireless communications links for which an individual parameter switching point is being determined.

31. The wireless terminal of claim 30, wherein potential parameter switching points are super slot boundaries and wherein the predetermined manner includes selecting the last preceding superslot boundary occurring in the communications link preceding said reference point.

32. The wireless terminal of claim 28, wherein said parameter switching information includes timing information referenced with respect to a first wireless communications link, said first wireless communications link being one of said plurality of communications links, said received timing information includes a superslot identifier and a symbol time identifier.

33. The wireless terminal of claim 21, further comprising: link timing means for maintaining timing synchronization on a per link basis.

34. The wireless terminal of claim 19, further comprising: a link determination means for determining which one of said plurality of links is the first link.

35. The wireless terminal of claim 34 wherein said link determination means determines which one of said plurality of links is the first link from link identification information included with said received parameter switching information.

36. The wireless terminal of claim 34 wherein said link determination means determines which one of said plurality of links is the first link based on which link said received parameter switching information was communicated to the wireless terminal.

37. The wireless terminal of claim 34, wherein the parameter is one of an encryption key, a request dictionary indicator, and a scrambling mask.

38. A computer program product in a computer-readable medium encoded with instructions capable of being executed by a computer the computer program product operable to:
receive parameter switching point information over at least one of a plurality of wireless communications links corresponding to the wireless terminal, said switching point information indicating a point offset from a switching point;
determine a reference point in time from the received parameter switching point information corresponding to a first wireless communications link, said first wireless communications link being one of said plurality of wireless communications links; and
determine individual parameter switching points, the determined individual parameter switching points corresponding to different ones of said plurality of wireless communications links.

39. The computer program product of claim 38, wherein the individual parameter switching points are determined based on a predetermined relationship between the determined reference point and potential parameter switching points for the corresponding one of said plurality of wireless communications links.

40. The computer program product of claim 39, wherein the individual parameter switching points are determined using a function to determine said individual parameter switching points, said function being implemented in accordance with said predetermined relationship and using modular arithmetic computation.

41. The computer program product of claim 39, wherein the individual parameter switching point are determined by selecting the last preceding potential parameter switching point corresponding to the one of said plurality of wireless communications links for which an individual parameter switching point is being determined.

42. The computer program product of claim 41, wherein the potential parameter switching points are super slot boundaries.

43. The computer program product of claim 39, wherein the parameter switching information is determined by receiving timing information referenced with respect to the first wireless communications link.

44. The computer program product of claim 43, wherein the received timing information includes a superslot identifier and a symbol time identifier.

45. The computer program product of claim 43, wherein the parameter switching information is determined by receiving information identifying which communications link is the first wireless communications link.

46. The computer program product of claim 45, wherein the information identifying which communications link is the first wireless communications link includes a connection identifier.

47. The computer program product of claim 38, wherein the step parameter switching information is determined by receiving timing information referenced with respect to a first wireless communications link, said first wireless communications link.

48. The computer program product of claim 43 operable to determine which communications link is the first communications link to which the received timing information corresponds based on the communications link over which the timing information was received.

49. The computer program product of claim 38, operable to switch from using an old parameter to a new parameter with respect to a plurality of communications links, said switching occurring on a link by link basis using the determined switching point corresponding to the link and stored switching protocol information.

50. The computer program product of claim 46, wherein said parameter is an encryption parameter, said switching occurring on each link at points in time corresponding to encryption boundaries where said encryption parameter is permitted to change.

51. The computer program product of claim 39, wherein the parameter is one of an encryption key, a request dictionary indicator, and a scrambling mask.

52. The computer program product of claim 51, wherein said parameter is used for both an uplink and a downlink.

* * * * *